US006687396B1

United States Patent
Sugiura et al.

(10) Patent No.: US 6,687,396 B1
(45) Date of Patent: Feb. 3, 2004

(54) OPTICAL MEMBER INSPECTION APPARATUS, IMAGE-PROCESSING APPARATUS, IMAGE-PROCESSING METHOD, AND COMPUTER READABLE MEDIUM

(75) Inventors: Masayuki Sugiura, Saitama-ken (JP); Kiyoshi Yamamoto, Tokyo (JP); Taichi Nakanishi, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/361,170

(22) Filed: Jul. 27, 1999

(30) Foreign Application Priority Data

Jul. 29, 1998 (JP) .......................................... P10-214251

(51) Int. Cl.[7] ................................................ G06K 9/00
(52) U.S. Cl. ...................... 382/141; 382/190; 382/305; 356/127; 356/239.2
(58) Field of Search ................................. 382/141, 144, 382/145, 181, 190, 151, 305; 356/338, 124, 125, 126, 127, 432, 445, 239.1, 239.2; 250/310

(56) References Cited

U.S. PATENT DOCUMENTS 5,572,598 A  * 11/1996  Wihl et al. .................. 382/144
5,812,259 A  *  9/1998  Yoshino et al. ............. 356/432
5,847,822 A  * 12/1998  Sugiura et al. ............. 356/124
5,889,593 A  *  3/1999  Bareket ....................... 356/445
6,148,097 A  * 11/2000  Nakayama et al. ......... 382/141
6,172,363 B1 *  1/2001  Shinada et al. ............. 250/310
6,240,218 B1 *  5/2001  Michael et al. ............. 382/289

* cited by examiner

Primary Examiner—Jayanti K. Patel
Assistant Examiner—Sheela Chawan
(74) Attorney, Agent, or Firm—Greenblum & Bernstein, P.L.C.

(57) ABSTRACT

The image pick-up device picks up an image of the inspection target optical member whenever it rotates a predetermined angle. The image data which is output by the image pick-up device picking-up the image undergoes coordinate transformation from polar coordinate system to rectangular coordinate system and thereafter binarization process. The area of the defective candidate objects which are extracted from the image data in two color system obtained through the binarization process are normalized in accordance with the reference values prepared for each region in which said defective candidate objects formed within the image data. The points which are calculated as a result of this normalization, are added to the corresponding columns in the classification table. It is judged whether the inspection target optical member is satisfactory or not, in accordance with whether or not evaluation function calculated on the basis of the value in each column exceeds a predetermined reference value.

26 Claims, 18 Drawing Sheets

FIG.6
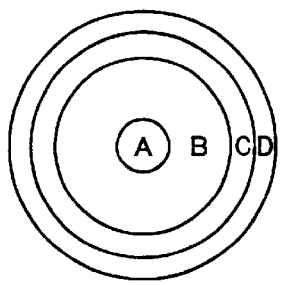
FIG.7
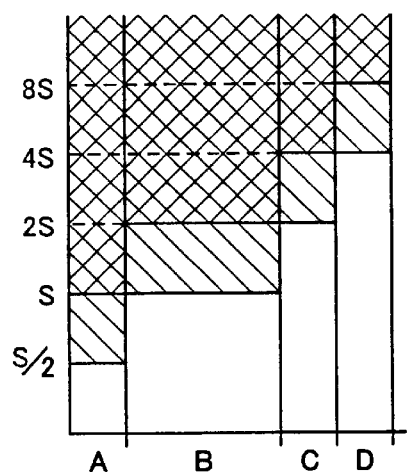
FIG.8
|  | Dust: ds | Scratch: k | Concentration: m |
|---|---|---|---|
| Region A | dsA | kA | mA |
| Region B | dsB | kB | mB |
| Region C | dsC | kC | mC |
| Region D | dsD | kD | mD |

OPTICAL MEMBER INSPECTION APPARATUS, IMAGE-PROCESSING APPARATUS, IMAGE-PROCESSING METHOD, AND COMPUTER READABLE MEDIUM

BACKGROUND OF THE INVENTION

1. Field of the Invention

The present invention relates to an optical member inspection apparatus, an image-processing apparatus, an image-processing method, and computer readable medium, for detecting an optical defect such as an abnormality in shape or the like, in an optical member such as a lens or the like.

2. Description of the Related Art

An optical member such as a lens or a prism, etc., is generally designed so that incident light flux is refracted regularly, advanced in parallel, converged onto a point or a line, or diverged. However, if the optical member contains therein a foreign matter such as a cotton waste or the like (so called "fuzz"), due to a defective formation thereof, or if the surface of the optical member is scratched when handled by operator after molding thereof, or if foreign matter is affixed to the surface of the optical member, the incident light flux will be scattered, and the desired performance cannot be obtained.

Thus, hitherto, various improvements have been devised for optical member inspection apparatus to detect the defective candidate objects of the optical member, in order to automatically judge whether the optical member is satisfactory or defective. In general, such an optical member inspection apparatus picks up an image of the optical member by a method in which the defective candidate objects may show up on the image data and extracts a region in which defective candidate objects are shown by conducting binary notation processing against the image data obtained by the aforementioned method. In case an area of any one of the regions which show the defective candidate objects exceeds a predetermined threshold value, the optical member inspection apparatus judges that the inspection target optical member is defective.

However, in accordance with the algorithm of the above-mentioned conventional judgement, the information obtained as a result of the inspection merely points out whether the inspection target optical member is satisfactory or defective. For instance for, an optical member which contains only one defective candidate object having an area which exceeds the threshold value, and an optical member which contains many of the defective candidate objects are confronted, it may be said that the degree of defect is greater for the latter than the former. But, the aforementioned conventional algorithm of judgement cannot evaluate the difference of degree of defects between such optical members because of the above-mentioned reason. In addition, if an optical member which contains only one defective candidate object having an area which slightly exceeds the threshold value and an optical member which contains many defective candidate objects having areas which are slightly below the threshold value are compared, the degree of defect of the latter may exceed that of the former. But, based on the above-mentioned conventional control algorithm, the former will always be judged as defective, and the latter will always be judged as satisfactory. Thus, in accordance with the conventional algorithm of judgement, the degree of defects of the inspection target optical members cannot be evaluated. Furthermore, unless the degree of defects of the inspection target optical members is evaluated, even if statistical processing of the inspection results for specified number of the optical members are made, the only thing which can be made clear will be the classification of category of defective candidate objects which exceed respective threshold value.

SUMMARY OF THE INVENTION

It is therefore an object of the present invention to provide an optical member inspection apparatus, an image-processing apparatus, an image-processing method, and computer readable media which can numerically express the overall defective or satisfactory degree of the inspection target optical members by putting the position in which each defective candidate object is formed into consideration and by evaluating the influence of each defective candidate object on the whole performance of the inspection target optical member.

An optical member inspection apparatus according to the present invention comprises an image pick-up device which picks up image of an inspection target optical member and which outputs image data indicating the image of the inspection target optical member, an extraction processor which extracts, from the image data, a portion having brightness different from its surrounding in the image data as an extracted object, a graphic feature value measuring processor which measures a graphic feature value of the extracted object, a position measuring processor which measures a position of the extracted object in the image data, a normalization processor which calculates a normalized value of the extracted object by normalizing the graphic feature value measured by the graphic feature value measuring processor by the use of reference in accordance with the position measured by the position measuring processor, and an operation processor which calculates a predetermined evaluation function based on all normalized values calculated by the normalization processor with respect to all extracted object which are extracted from same image data by the extraction processor.

An image-processing apparatus according to the present invention comprises an extraction processor which extracts, from an image data which is obtained by picking up image of an inspection target optical member and which indicates the image of the inspection target optical member, a portion having brightness different from its surrounding in the image data, as an extracted object, a graphic feature value measuring processor which measures a graphic feature value of the extracted object, a position measuring processor which measures a position of the extracted object in the image data, a normalization processor which calculates a normalized value of the extracted object by normalizing the graphic feature value measured by the graphic feature value measuring processor by the use of reference in accordance with the position measured by the position measuring processor, and an operation processor which calculates a predetermined evaluation function based on all normalized values calculated by the normalization processor with respect to all extracted object which are extracted from same image data by the extraction processor.

When constructed in the above-mentioned manner, the graphic feature value of each extracted object extracted from the image data by the extraction processor is normalized by the use of reference according to the position of the extracted object in the image data by the normalization processor. Therefore, if the operation processor executes the evaluation function based on all normalized values calculated with respect to all extracted objects which are extracted from same image data by the extraction processor, a value indicating the degree of overall defects of the inspection target optical member is obtained.

Concretely, the graphic feature value which the graphic feature value measuring processor measures may be area, maximum fillet diameter, average brightness or maximum brightness of the extracted object.

The position measuring processor may measure the distance itself from the position equivalent to the optical axis of the inspection target optical member to the extracted object or discriminate region in which the extracted object is formed among a plurality of concentric regions within the image data.

The normalized processor may calculates the normalized value by executing some kind of function on the measured distance and the graphic feature value in case the position measuring processor measures the distance itself, or may normalize the graphic feature value on the basis of the reference value which beforehand relates to the distinguished region in case the position measuring processor distinguishes a region,. More preferably, the normalization processor may conduct normalization so that the graphic feature value of the extracted object caused by optical defects formed in positions where optical defects greatly influence the performance of the inspection target optical member becomes a comparatively large normalized value, and the graphic feature value of extracted object caused by optical defects formed in positions where optical defects do not influence the performance of the inspection target optical member so much becomes a comparatively small normalized value.

The image-processing method according to the present invention comprises steps of extracting, from an image data which is obtained by picking up image of an inspection target optical member and which indicates the image of the inspection target optical member, a portion having brightness different from its surrounding in the image data as an extracted object, measuring a graphic feature value of the extracted object, measuring a position of the extracted object in the image data, calculating a normalized value of the extracted object by normalizing the graphic feature value by the use of reference in accordance with the position of the extracted object, and calculating an evaluation function based on all normalized values with respect to all extracted object which are extracted from same image data.

A computer readable media according to the present invention stores a program. The program causes a computer to perform method which comprises steps of extracting, from an image data which is obtained by picking up image of an inspection target optical member and which indicates the image of the inspection target optical member, a portion having brightness different from its surrounding in the image data as an extracted object, measuring a graphic feature value of the extracted object, measuring a position of the extracted object in the image data, calculating a normalized value of the extracted object by normalizing the graphic feature value by the use of reference in accordance with the position of the extracted object, and calculating an evaluation function based on all normalized values with respect to all extracted object which are extracted from same image data.

BRIEF DESCRIPTION OF THE DRAWING

The invention will be described below in detail with reference to the accompanying drawings, in which

FIG. 6 is a drawing which indicates the partial regions of image data.

FIG. 7 is a graph which indicates the relation between each of the partial regions and the normalizing reference value.

FIG. 8 is a table showing the classification of defects

DESCRIPTION OF THE PREFERRED EMBODIMENT

FIRST EMBODIMENT

The present disclosure relates to subject matter contained in Japanese Patent Application NO.10-214251 (filed on 1998 7,29) which is expressly incorporated herein by reference in its entirety.

Structure of the Optical Member Inspection Apparatus

Figure 1:
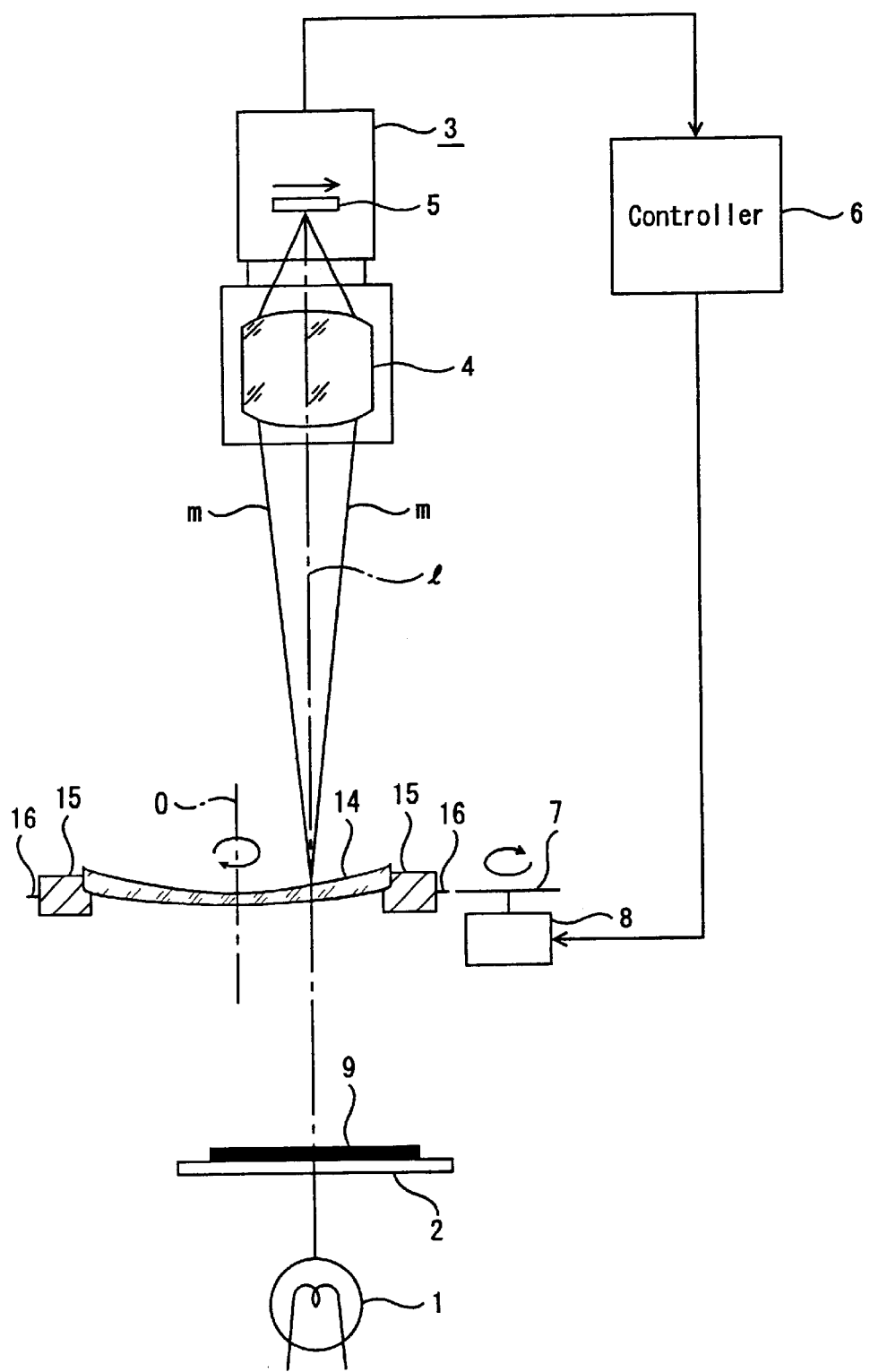
FIG. 1 is a cross-sectional view schematically showing an optical member inspection apparatus according to the first embodiment of the present invention.

A schematic structure of optical member inspection apparatus according to a first embodiment of the present invention is shown in FIG. 1. As shown in FIG. 1, the illumination lamp 1, diffusion plate 2, and the image pick-up device 3 which compose the optical member inspection apparatus, are all aligned on a common optical axis 1. The image pick-up device 3 includes an imaging lens 4 which is a positive lens system, and the CCD line sensor 5 which picks up the image formed from light converged by the imaging lens 4. The CCD line sensor 5 is set in the image pick-up device 3 so that row of pixels consisting the CCD line sensor 5 is oriented to horizontal direction in FIG. 1. Furthermore, the row of the pixels of the CCD line sensor 5 perpendicularly intersects with the optical axis 1 of the imaging lens 4 at the central portion. In addition, the imaging lens 4 is held in the image pick-up device 5 so that it can freely move for focusing with respect to the CCD line sensor 5. The image pick-up device 3 itself is attached to unillustrated frame of the optical member inspection apparatus so that it may reciprocate in the direction of the optical axis 1. The CCD line sensor 5 linearly captures image formed by the imaging lens 4, self-scans each pixels in order of arrangement thereof, and successively outputs electric charges accumulated in the pixels; This occurs repeatedly at intervals of predetermined time in which electric charge are properly accumulated in each pixel. The electric charger thus output from the CCD line sensor 5 undergo 9 predetermined amplification and A/D conversion, and then are input to the controller 6 as image data i.e., consists of brightness signal of one line).

Figure 2:
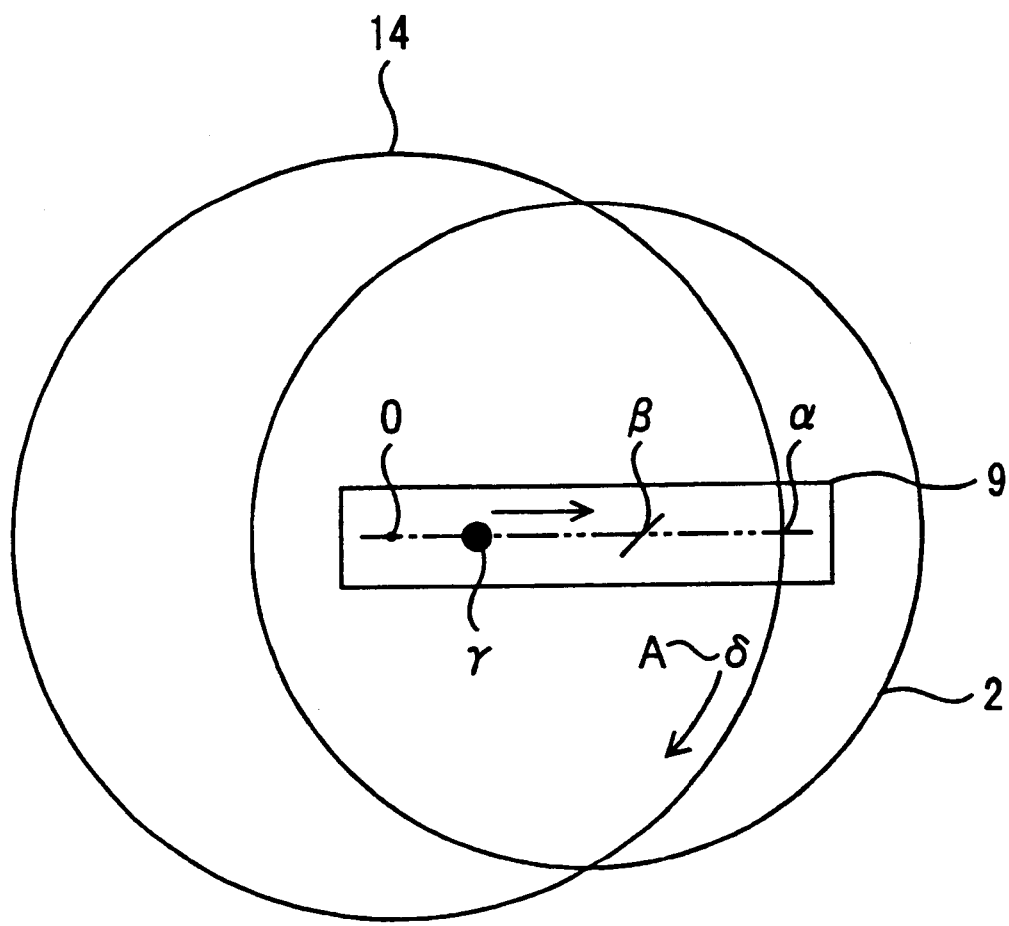
FIG. 2 is a plane view of the inspection target optical member from the direction of the image pick up device.

An inspection target optical member 14 is a circular lens as shown in FIG. 1, as well as FIG. 2 which is a plane view from a direction of the image pick-up device 3. The inspection target optical member 14 is held by a holder 15 which is set to the unillustrated frame of the optical member inspection apparatus, so that its surface adjacent to the imaging lens 4 becomes conjugate with the imaging plane of the CCD line sensor 5 with respect to the imaging lens 4. This holder 15 has a generally annular shape about the center axis O which is offset in parallel with the optical axis 1 of the imaging lens 4 to hold the entire outer edge of the inspection target optical member 14. The holder 15 can rotate around the center axis O in a plane which intersects perpendicularly with the optical axis 1. The outer periphery of the holder 15 is formed with an annular gear 16 which engages with a pinion gear 7 fixed to driving shaft of a driving motor 8. Therefore, when the driving motor 8 rotates its driving shaft, the holder 15 is rotated through both the gears 7 and 16 and the inspection target optical member 14 held by the holder 15 is rotated in a plane perpendicular to the optical axis 1.

The magnification of the imaging lens 4 (in other words, the position of the image pick-up device 3 itself and relative position of the imaging lens 4 with respect to the CCD line sensor 5) are adjusted so that an image of the region between the center axis O and the outer edge of the inspection target optical member 14 can be formed on the image pick-up plane of the CCD line sensor 5. Therefore, the CCD line sensor 5 can pick-up an image of the surface of the inspection target optical member 14 for one line along the radial direction thereof. In FIG. 2, a linear region which can be picked up by the CCD line sensor 5 is shown by a two-dot chain line, which is called "an imaging target region" hereinafter The illumination lamp 1 is an incandescent lamp which emits illuminating light (that is, white light) and which is fixed to the unillustrated frame of the optical member inspection apparatus.

The diffusion plate 21, which is placed between the illumination lamp 1 and the inspection target optical member 14 as illustrated in FIG. 2, has a discoid shape having a diameter larger than the radius of the inspection target optical member 14. Its surface is frosted as a rough surface.

Figure 4:
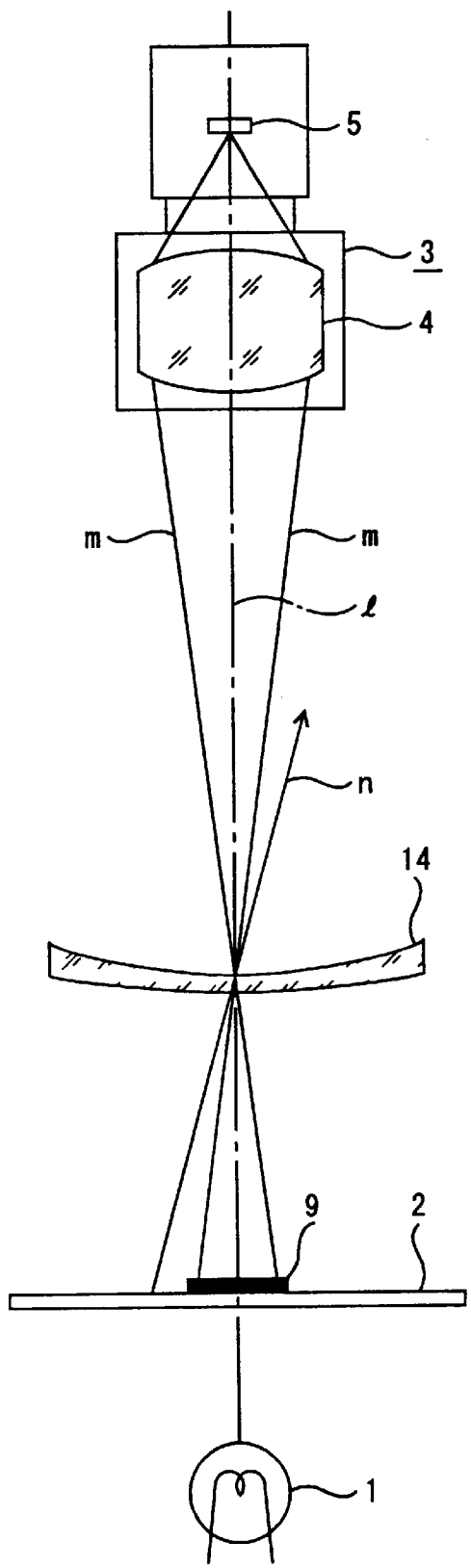
FIG. 4 is an illustration showing light ray lines in case there is no optical defect in the inspection target optical member.

Therefore, the diffusion plate 2 receives the illuminating light emitted from the illumination lamp 1 on its entire back surface and diffuses the light toward the inspection target optical member. 14. The diffusion plate 2 is fixed to the unillustrated frame of the optical member inspection apparatus so as to perpendicularly intersect with the optical axis 1 of imaging lens 4 at its center. A light shield plate 9 having a strip-like shape is stuck onto the upper surface of the diffusion plate 2 so that its longitudinal direction become parallel with the direction of the row of pixels in the CCD line sensor 5. The center of the light shield plate 9 coincides with the optical axis 1 of the imaging lens 4. The overall length of the light shielding plate 9 in its longitudinal direction is longer than the radius of the inspection target optical member 14. The width of the light shielding plate 9 is broader than the interval between the marginal rays m, m of light which can be incident on each pixel of the CCD line sensor 5 as shown in FIG. 4 which is a cross-sectional view of the optical member inspection apparatus in a direction perpendicular to the row of the pixels of CCD line sensor 5.

Figure 3:
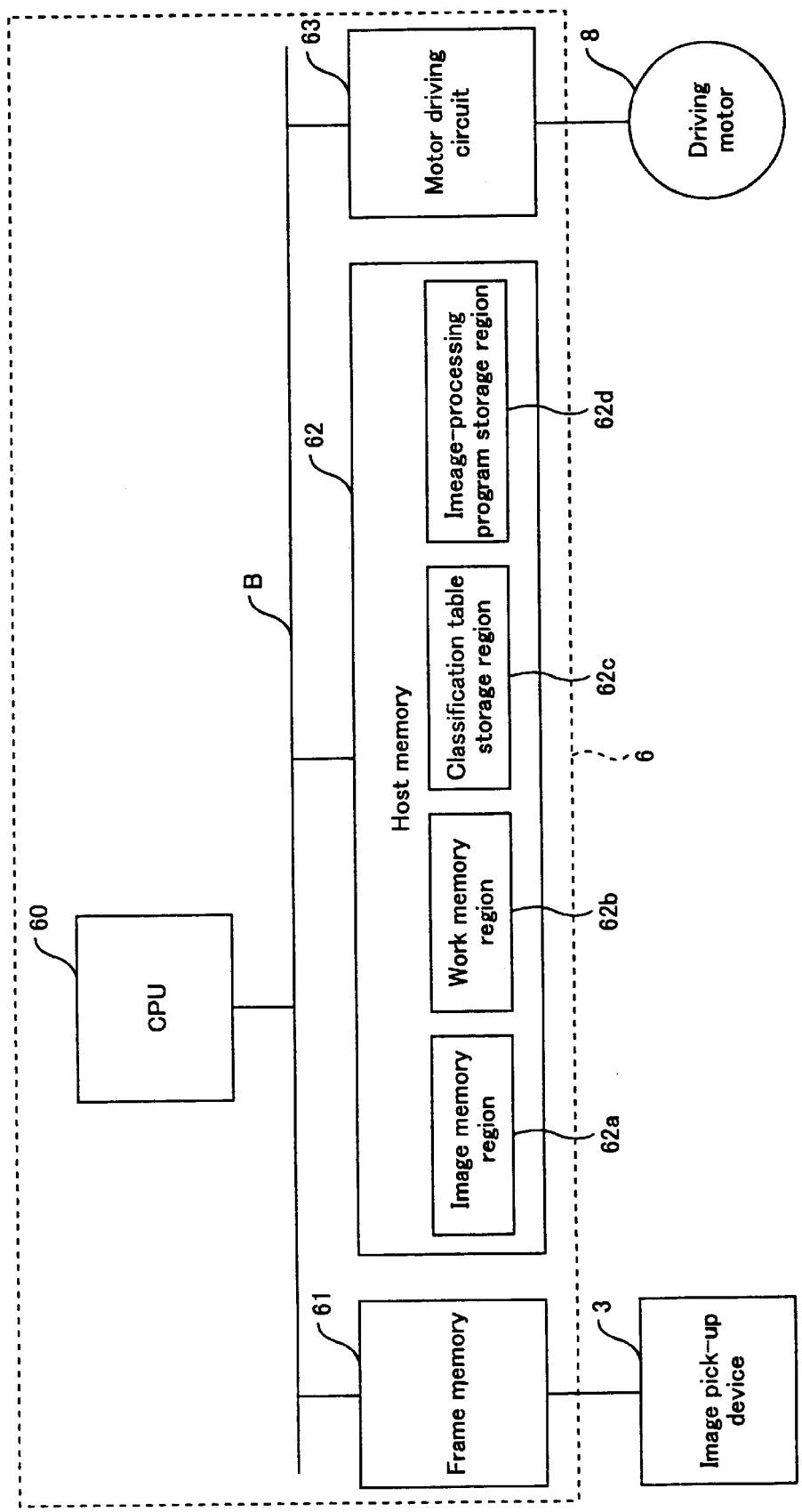
FIG. 3 is a block diagram showing the internal circuit configuration of the controller.

The controller 6 is a processor to judge whether the inspection target optical member 14 is satisfactory or defective based on the image data input from the image pick-up device 3, and to supply drive current to the driving motor 8. FIG. 3 is a block diagram which shows internal circuit configuration of the controller 6. As shown in FIG. 3, the controller 6 is constructed of a CPU 60, a frame memory 61, a host memory 62, and a motor driving circuit 63 which are connected to each other through a bus B. The frame memory 61 is a buffer in which the image data supplied from the image pick-up device 3 is written. The host memory 62 contains an image memory region 62a, a work memory region 62b, a classification table storage region 62c, and an image-processing program storage region 62d. The image data stored in the frame memory 61 is transferred to each line of the image memory region 62a sequentially from the head line thereof, every interval of predetermined time. The coordinate system of the image data written into the image memory region 62a is polar coordinate system because of the image pick-up mode of the image pick-up device 3. The work memory region 62b is the one into which (1) image data stored in the image memory region 62a is written in a state that coordinate transformation (that is, coordinate transformation from polar coordinate system to rectangular coordinate system) has been performed thereon, (2) the image data in rectangular coordinate system is performed with binarization process in accordance with predetermined threshold values, and (3) "defective candidate objects" that are extracted through the binarization process as groups of pixels having high brightness values among pixels contained in the image data are evaluated. The classification table storage region 62c is the one which stores a classification table shown in FIG. 8. The details of the classification table will be explained later on. The image-processing program storage region 62d stores the image-processing program executed by the CPU 60 as a computer readable media.

The motor driving circuit 63 supplies a driving current to the the driving motor 8 for driving the driving motor 8 so that the holder 15 and the inspection target optical member 14 rotate at a constant speed in a clockwise direction as viewed from the image pick-up device 3.

CPU 60 is a computer for controlling the whole of the controller 6 serving as the extraction portion, graphic feature measuring portion, position measuring portion, normalization processor, operation processor, and judgement processor. More minutely, the CPU 60 executes the image-processing program stored in the image-processing program storage region 62d of the host memory 62. As a result, the CPU 60 periodically transfers the image data temporarily stored in the frame memory 61 to the image memory region 62a of the host memory 62. When the image data corresponding to the whole of the inspection target optical member 14 is composed in the image memory region 62a, the CPU 60 performs the coordinate transformation on the image data, and writes the image data in the rectangular coordinate system into the work memory region 62b. Then, the CPU 60 performs the binarization process on the image data so that defective candidate objects may be extracted. Next, the C-PU 60 normalizes the area of each defective candidate object which has been extracted through the binarization process in accordance with its relative position in the image data, classifies the normalized area of each defective candidate object in accordance with the various references described later on, then tabulates the classified area in the classification table stored in the classification table storage region 62c. After completing the classification and tabulation on all of defective candidate objects, the CPU 60 calculates the evaluation function F on the basis of the tabulation results. Lastly, the CPU 60 judges whether the inspection target optical member 14 is satisfactory or defective in accordance with whether or not the calculated evaluation function F exceeds satisfactory or defective judgement reference value. Furthermore, the CPU 60 outputs an instructions for making the motor driving circuit 63 supply a drive current to the driving motor 8, synchronously with the receiving of the image data from frame memory 61.

Principle of Detection of a Defective Candidate Object

In the optical member inspection apparatus which is constructed as described above, in the plane shown in FIG. 4, the light which could be incident upon each pixel of the CCD line sensor 5 after passing through the imaging lens 4 would be derived from principal ray(s) of light travelling along the optical axis 1 of the imaging lens 4 and which passes between the marginal ray lines m, m shown in FIG. 4. If these marginal ray lines m, m are extended in a reverse direction toward the illumination lamp 1, these marginal ray lines m, m intersect each other at surface of the inspection target optical member 14 and further spread toward the diffusion plate 2. On the diffusion plate 2, these marginal ray lines m, m are shielded by the light shielding plate 9. Thus, as shown in FIG. 4, if there are no optical defects in the imaging target region (that is, a region optically conjugate with the light receiving surface of the row of pixels of the CCD line sensor 5 with respect to the imaging lens 4) in the inspection target optical member 14 by the CCD line sensor 5, there will be no incident light on each pixel of the CCD line sensor 5. More specifically, a light ray n diffusing from a portion around the light shielding plate 9 on the surface of the diffusion plate 2 and passing through the imaging target region in the inspection target optical member 14 travels outside the marginal ray lines m, m, so that it is not incident upon the imaging lens 4. Furthermore, a light ray diffusing from a portion around the light shielding plate 9 on the surface of the diffusing plate 2 and passing through a portion other than the imaging target region in the inspection target optical member 14 may be incident upon the imaging lens 4, but it cannot be converged on each pixel of the CCD line sensor 5. As a result, the image data output from the image pick-up device 3 represents an image of which tone is dark over the whole region except for a bright portion corresponding to the outer edge of the inspection target optical member 14. which is caused by diffusion light at the outer edge.

Figure 5:
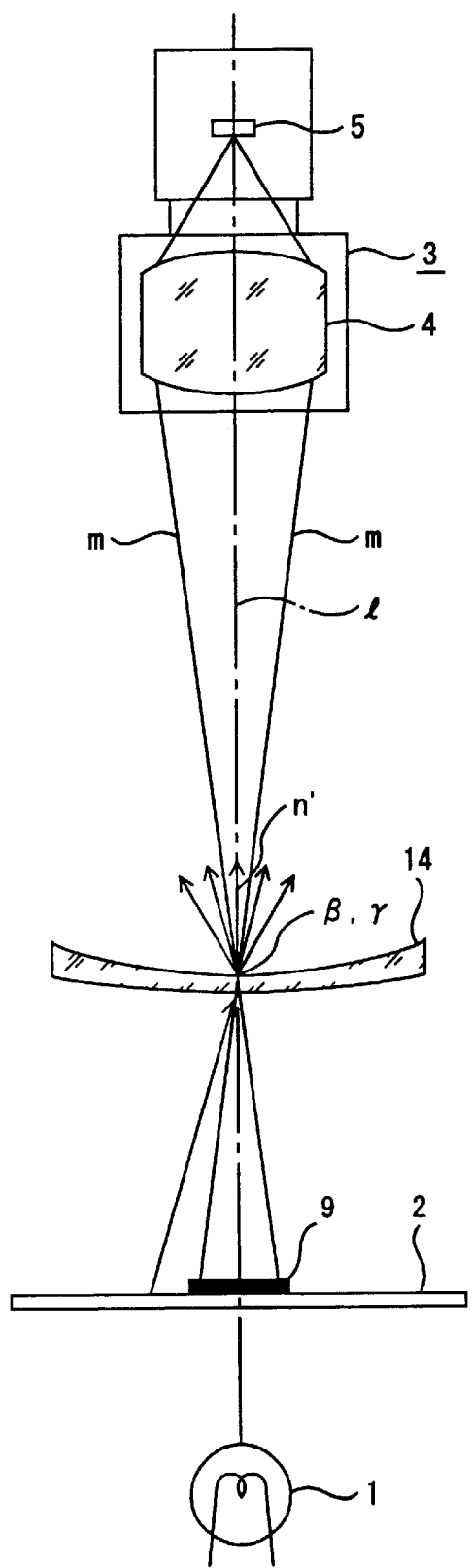
FIG. 5 is an illustration showing light ray lines in case there are optical defects in the inspection target optical member.

On the contrary, in case where there is a scratch β a dust γ in the imaging target region on the surface of the inspection target optical member 14 as shown in FIG. 2, when a light ray n diffusing from the portion around the light shielding plate 9 on the surface of the diffusion plate 2 impinges these scratches β and dust γ, the light ray n is diffused by these scratch β and dust γ, as shown in FIG. 5. In this case, a diffused light ray n' can diverge at the point of the intersections of the marginal ray lines m, m, so that a part of the diffused light ray n' can be incident upon each pixel of the CCD line sensor 5 via the imaging lens 4. As a result, images of these scratch β and dust γ which are brighter than the surrounding are formed on the image pick-up plane of the CCD line sensor 5.

The picking-up of an image (in other words, accumulation of electric-charge and self-scanning) by the CCD line sensor 5 is performed synchronously with the rotation of the inspection target optical member 14. by the driving motor 8; more specifically, whenever the inspection target optical member 14 rotates by a predetermined angle. Whenever picking-up of an image (that is, accumulation of electric-charge and self-scanning) is performed by the CCD line sensor 5, line image data is written into the frame memory 61 of the controller 6 and transferred to the image memory region 62a of the host memory 62. Thus, as the inspection target optical member 14 rotates, the liner image data picked up by the image pick-up device 3 is successively written into each row of the image memory region 62a sequentially from the head row thereof.

The coordinates system of the image data stored in the image memory region 62a of the host memory 62 at the point of time when the inspection target optical member 14 rotates 360° is polar coordinate system. The image data in the polar coordinates system is transformed into rectangular coordinates as shown in FIG. 6 by the coordinate transformation. In the image data in the rectangular coordinates system, the shape of a defective candidate object which is a bright portion showing defective factor will coincide with the shape of the optical defect itself.

Principal of Quality Evaluation as to an Inspection Target Optical Member

Then, the CPU 60 performs the binarization process by comparing the brightness values of pixels which compose the image data stored in the image memory region 62a with the predetermined threshold value, rewrite the brightness values of pixels which originally exceed the threshold value to "255," and rewrite the brightness values of pixels which is originally below the threshold value to "0." The predetermined threshold value is set as a value which is higher than any brightness values of bright portions caused by noise and which is lower than any brightness values of bright portions caused by optical defects. As a result, only the defective candidate objects are extracted.

As shown in FIG. 6, the inspection target optical member 14 is divided into 4 concentric regions A–D of which centers are at the position equivalent to its optical axis. If an optical defect is formed in the region A among these regions, the influence of the optical defect on the performance of inspection target optical member 14 is the greatest. The influence of an optical defect formed in the other regions B–D on the performance of the inspection target optical member 14 decreases in the order of B, C, and D. Therefore, the extracted defective candidate objects are classified in accordance with respective regions in which they are formed.

Then, the CPU 60 normalizes, for every region, the area of each defective candidate object caused in the region, by dividing the area by the reference value R which is dedicatedly prepared for the region to convert the area into a point P (hereinafter referred to as "normalized value") which shows the degree of influence of optical defect corresponding to the defective candidate object on the performance of the inspection target optical member 14.

More specifically, in case the reference value R which should be applied to the region A is set to "S" which is equal to a reference value used in the conventional judgement algorithm as shown in FIG. 7, the CPU 60 applies "2S" as the reference value R to the region B, applies "4S" to the region C, and applies "8S" to the region D. In other words, reference value R is set so that magnitude of the reference value R becomes large as the position of the defective candidate objects become remote from the position equivalent to the optical axis of the inspection target optical member 14. If the area of the defective candidate objects is the same as the reference value R, the calculated normalized value P becomes "1." Thus, the defective candidate objects of area S formed in the region A, the defective candidate objects of area 2S formed in the region B, the defective candidate objects of area 4S formed in the region C, and the defective candidate objects of area 8S formed in the region D are respectively normalized so that the normalized values P become all "1." By normalized in this way, the defective candidate objects are converted into normalized value P which show the degree of influence on the performance of the inspection target optical member 14. As reference value R, reference value Rk is applied in case the defective candidate objects are caused by scratches and reference value Rd is applied in case the defective candidate objects are caused by dust. These reference values Rk, Rd are different from each other. Therefore, if the reference value Rk applied to defective candidate objects caused by scratches and formed in the region A is "Sk" and the reference value Rd applied to defective candidate objects caused by dust and formed in the region A is "Sd," the values of Sk and Sd becomes different from each other. As the result, prior to the calculation of the normalized value P, the CPU 60 judges whether the defective candidate object of processing target is caused by scratch or by dust.

Figure 9:
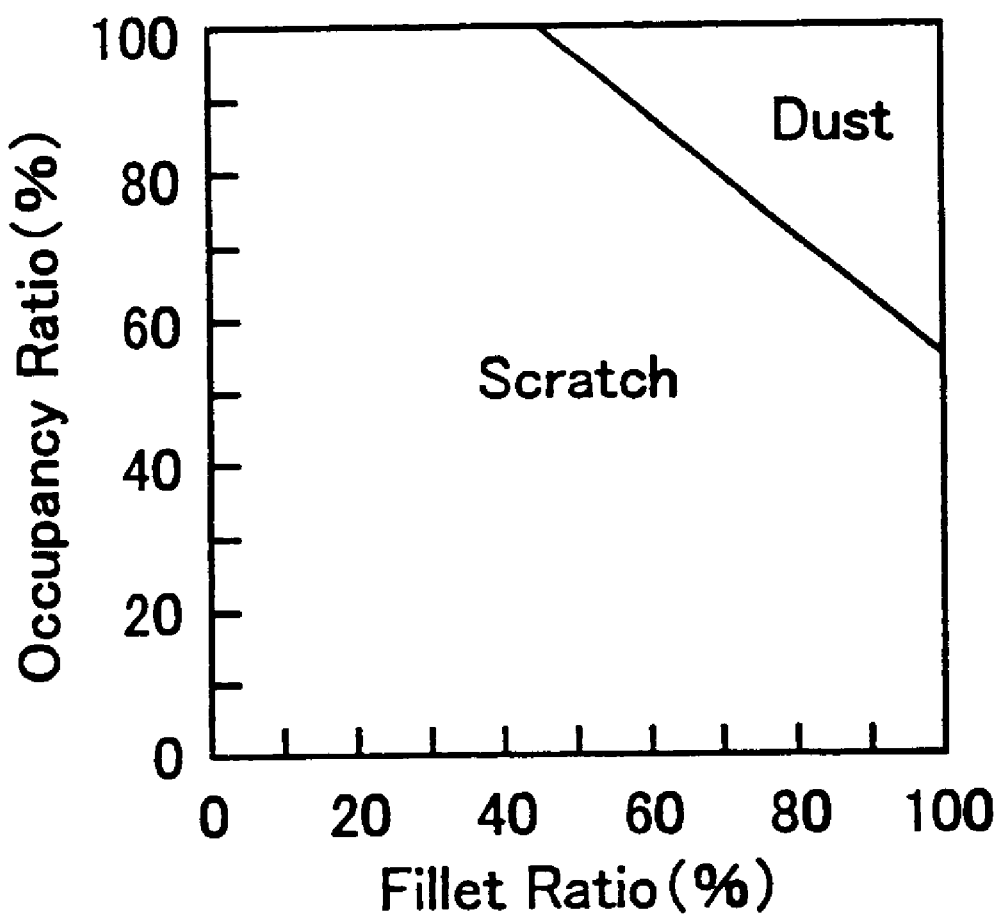
FIG. 9 is a graph that indicates the threshold value function used for the shape judgement.

This judgement is made by using threshold function shown in FIG. 9. More specifically, the CPU 60 measures the maximum width (X fillet) in direction of X axis (that is, horizontal direction in FIG. 6) and the maximum width (Y fillet) in direction of Y axis (that is, vertical direction of FIG. 6) of the defective candidate object of processing target and calculates the percentage (which is called "fillet ratio") of the smaller between X fillet and Y fillet to the other, in accordance with the following equation.

$$\text{Fillet Ratio} = \text{Smaller Fillet}/\text{Larger Fillet} \times 100 \quad (1)$$

At the same time, the CPU 60 executes the following equation (2) with respect to the X fillet, Y fillet and area of defective candidate object of processing target to calculate "occupancy ratio."

$$\text{Occupancy Ratio} = \text{Area of the Defective candidate objects}/(X \text{ fillet} \times Y \text{ fillet}) \times 100 \quad (2)$$

Then, the CPU 60 compares the calculated fillet ratio and occupancy ratio with the threshold function shown in FIG. 9, and judges whether the defective candidate object of processing target is caused by dust or by scratch. More specifically, in case the intersection of the fillet ratio and the occupancy ratio is positioned above the threshold function in the graph shown in FIG. 9, the CPU 60 judges that the defective candidate element of processing target is caused by dust, and in case the intersection of the fillet ratio and the occupancy ratio is positioned below the threshold function, the CPU 60 judges that the defective candidate object of processing target is caused by scratch.

After judging whether the defective candidate object of processing target is caused by scratch or by dust in this way, the CPU 60 decides reference value Rk or Rd in accordance with the judgement result, that is, classification of scratch or dust and the region in which the defective candidate object of processing target is formed. Then, the CPU 60 calculates the normalized value P based on the reference value Rk or Rd.

Next, if the normalized value P of the defective candidate object of processing target calculated in the above manner is 0.5 or more, the CPU 60 adds the normalized value P into the column of the classification table stored in the classification table storage region 62C which corresponds to the classification of the dust (ds) or scratch (k) and to the region A–D in which the defective candidate object of processing target is formed. On the contrary, in case the calculated normalized value P is less than 0.5, CPU 60 judges that the optical defect which is a causation of the normalized value P is not large enough to influence the performance of the inspection target optical member 14 and does not add the normalized value P to the classification table. However, if a plurality of small defective candidate objects of which normalized value P are all less than 0.5 are strung within specified interval, there is high possibility that the bright portion caused by same optical defect is separated into several defective candidate objects during the binarization process. Thus, in case such a small defective candidate object is detected, the CPU 60 searches for another defective candidate objects within the specified distance from the defective candidate object. If another defective candidate object(s) is found, the CPU 60 further searches for different defective candidate objects within the specified distance. This operation is continued until no further defective candidate objects can be found.

In case the number of the defective candidate objects which are close to one another within the specified interval amounts to three or more, the CPU 60 adds a point calculated by multiplying the number of the defective candidate objects by 0.25 to the column of the classification table which corresponds to concentration (m) and to region A–D in which the defective candidate objects are formed. In other words, in case that a defective candidate object of which normalized value P is calculated as being less than the predetermined value and more than the predetermined number (two) of other defective candidate objects are strung within the specified interval from said defective candidate object, a value obtained by multiplying the total number (three or more) of the defective candidate objects strung within the specified interval by a certain constant (0.25) is classified, as normalized value P corresponding to the whole of the defective candidate objects strung within the specified interval, independently from normalized value P exceeding 0.5 calculated for other defective candidate objects.

When the above mentioned additions of the normalized values P to the classification table are conducted for all of the defective candidate objects, the CPU 60 first calculates the square root of sum of square of each total of normalized value P written in respective column corresponding to dust (ds) in the classification table, in accordance with the following equation (3). Then the CPU 60 calculates the square root of sum of square of each total of normalized value P written in respective column corresponding to scratch (k), in accordance with the following equation (4). Then CPU 60 calculates the square root of sum of square of each total of normalized value P written in respective column corresponding to the concentration (m), in accordance with the following equation (5). After completing the calculations mentioned above, the CPU 60 further calculates the square root of sum of square of the values respectively calculated for dust (ds), scratch (k) and the concentration (m), as evaluation function F in accordance with the following equation (6).

$$ds=((dsA)^2+(dsB)^2+(dsC)^2+(dsD)^2)^{0.5} \quad (3)$$

$$k=((kA)^2+(kB)^2+(kC)^2+(kD)^2)^{0.5} \quad (4)$$

$$m=((mA)^2+(mB)^2+(mC)^2+(mD)^2)^{0.5} \quad (5)$$

$$F=(ds^2+k^2+m^2)^{0.5} \quad (6)$$

The value of this evaluation function F is the one which indicates overall performance of whole of the inspection target optical member 14. The larger the value of the evaluation function F becomes, the worse the performance of the inspection target optical member becomes. Therefore, the evaluation function F is compared with specified satisfactory or defective judgement reference. If the value of the evaluation function F is less than the satisfactory or defective judgement reference value, it is judged that the inspection target optical member 14 is satisfactory. On the contrary, if the value of the evaluation function F is equal to or more than the satisfactory or defective judgement reference value, it is judged that the inspection target optical member 14 is defective.

Furthermore, the total of each normalized value P written in respective column of the classification table and the values of the evaluation function F are stored in the unillustrated disc device as inspection results for said inspection target optical member 14, respectively. Then, average values, standard deviations, histograms, etc. of the stored inspection results are calculated, for every lot of the optical members 14 that have been inspected, so that the quality can be controlled statistically. By doing so, statistical processing can be conducted for the overall quality of the inspection target optical members 14, for each region, or for each classification of the defective candidate object, respectively. Therefore, it is very effective from the standpoint of quality control in the manufacturing process.

Control Processing

Figure 10:
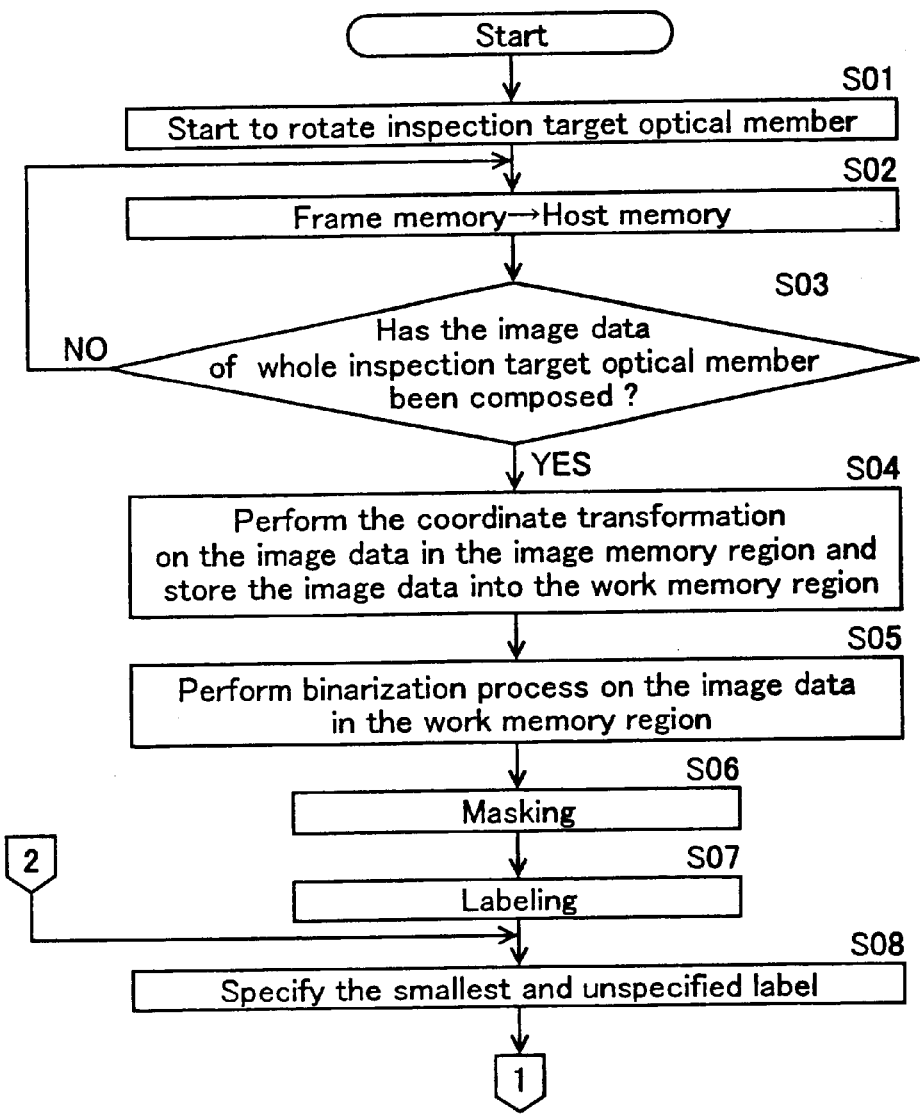
FIG. 10 is a flowchart showing the control processing executed by the CPU.
Figure 11:
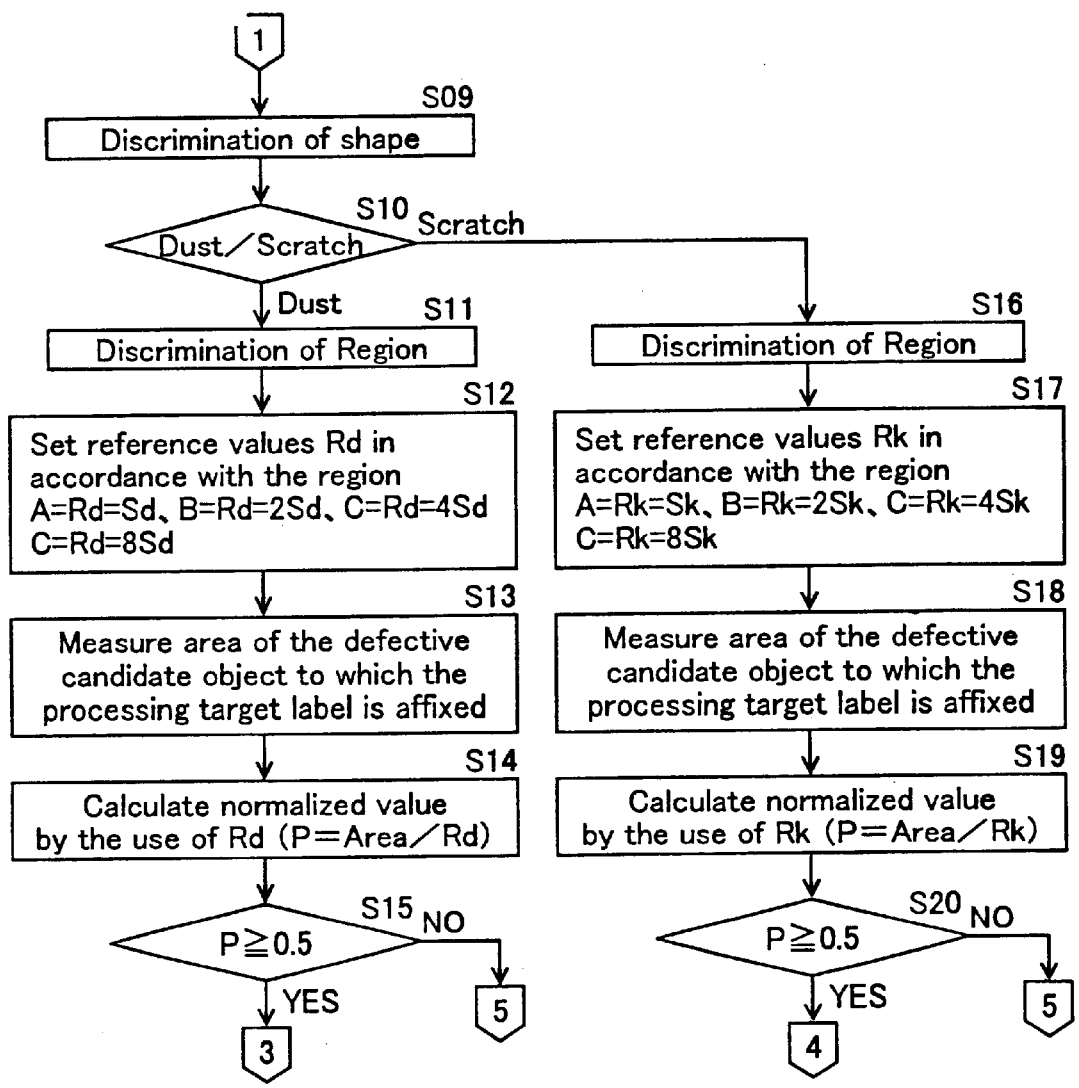
FIG. 11 is a flowchart showing the control processing executed by the CPU.
Figure 12:
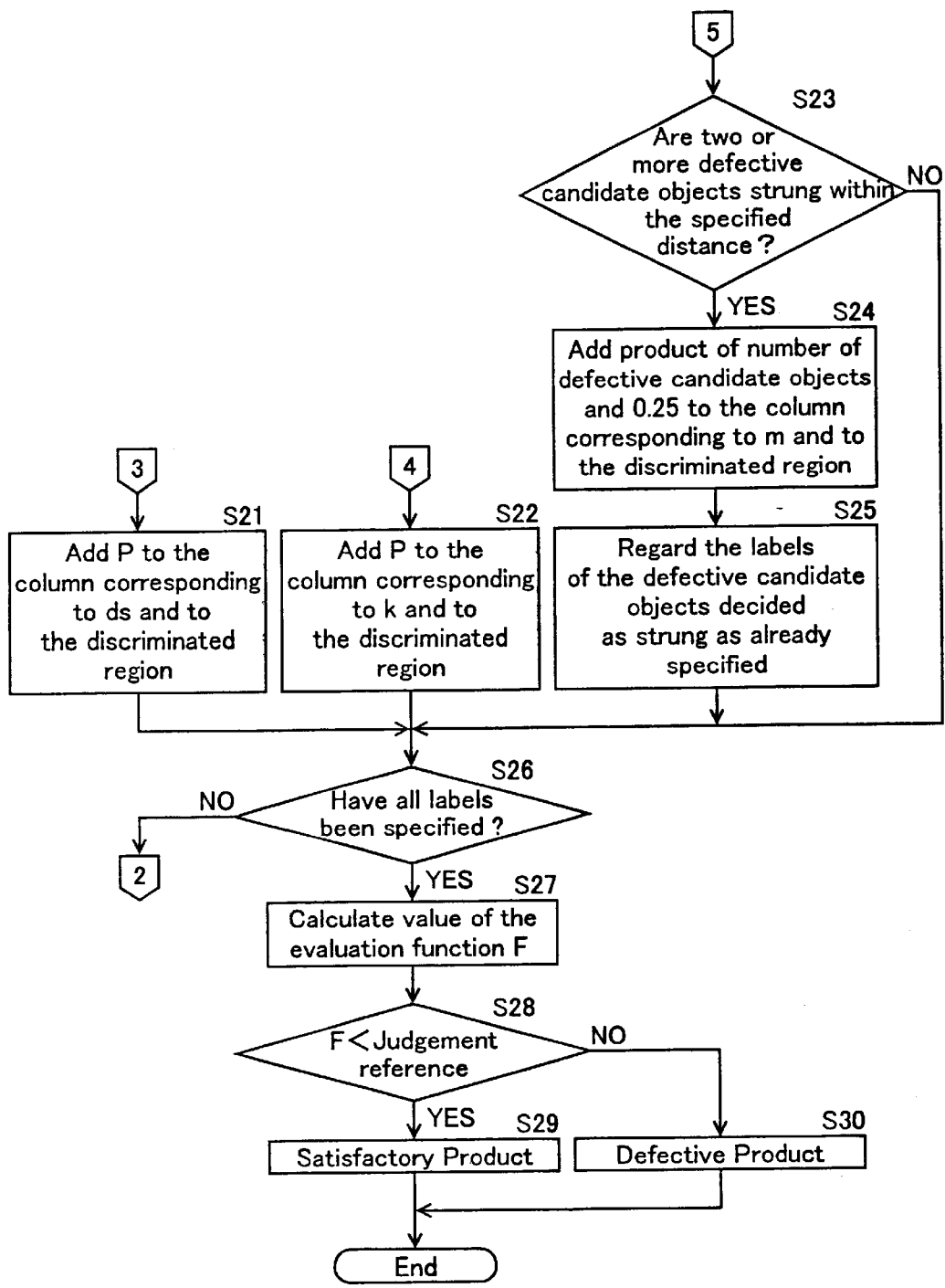
FIG. 12 is a flowchart showing the control processing executed by the CPU.

Next, an explanation is given on the contents of the control processing for conducting satisfactory or defective judgement based on the principle of detection of a defective candidate object and the principle of quality evaluation executed by the controller 6 (CPU 60) in accordance with the image-processing program read from image-processing program storage region 62*d*, with reference to the flowcharts shown in FIG. 10 through FIG. 12.

Control processing of FIG. 10 is started when the unillustrated inspection start-up button which is connected to the controller 6 is pressed. In SO1 firstly executed after start-up, the CPU 60 commands motor driving circuit 63 to supply drive current to the driving motor 8 so that the inspection target optical member 14 is rotated at a constant speed.

In next SO2, the CPU 60 transfers the image data which has been written in the frame memory 61 from the image pick-up device 3 to the image memory region 62*a* of the host memory 62.

In next SO3, the CPU 60 checks whether image data corresponding to the whole of the inspection target optical member 14 has been composed in the image memory region 62*a* by the transformation of image data in SO2. Then, in case the image data corresponding to the entire inspection target optical member 14 has not yet been composed, the CPU 60 returns the processing to SO2 and waits until the image pick-up device 3 will write image data obtained through next image picking-up into the frame memory 61.

On the other hand, in case the image data corresponding to the whole of the inspection target optical member 14 has been composed, the CPU 60 advances the processing to SO4.

In SO4, the CPU 60 transforms the coordinate system of the image data stored in the image memory region 62*a* from the polar coordinate system to rectangular coordinate system by performing the coordinate transformation and store the image data in the rectangular coordinate system into the work memory region 62*b*.

In next SO5, the CPU 60 performs the above mentioned binarization process for the image data in the work memory region 62*b* to obtain image data in two color system including the defective candidate objects which are emphasized. More specifically, the CPU 60 rewrites the brightness value of the pixel which is originally below the predetermined threshold value to "0" and also rewrites the brightness value of the pixel which originally exceeds the threshold value to "255."

In next SO6, the CPU 60 executes masking process in which the portion equivalent to the outside of the outer edge of the inspection target optical member 14 (that is, outer edge of the region D in FIG. 6) in the image data is removed.

In next SO7, the CPU 60 affixes unique number, that is label n (n=1, 2, 3, - - -) to each defective candidate object extracted from the binarized data. More specifically, the CPU 60 searches the brightness values of each line sequentially from the head line in the image data in two color system to which the masking process has already been completed. Then, the CPU 60 detects a pixel which has a brightness value (=255) corresponding to the defective candidate objects, the CPU 60 rewrites the brightness value of that pixel to the unique label n. However, in case the pixel that has been detected as having the brightness value (=255) is adjoining another pixel of which the brightness value has already been re-written to the value of label n ($\neq$0, 255), the CPU 60 rewrites the brightness value of the pixel which has been detected to the brightness value (n$\neq$0, 255) of the adjoined pixel.

Next, the CPU 60 executes loop processing of SO8 through S26 with respect to each defective candidate region sequentially, in the order of label n which was affixed in SO7, in order to calculate the normalized value P for each defective candidate region,.

In SO8 firstly executed after entering this loop, the CPU 60 specifies the smallest label among the unspecified labels n as a processing target label.

In next SO9, the CPU 60 judges as mentioned above whether defective candidate object to which the processing target label n specified in SO8 is affixed is caused by dust or by scratch. In case it is judged that the defective candidate object is caused by dust, the CPU 60 advances the processing from S10 to S11. On the other hand, in case it is judged that the defective candidate object is caused by scratch, the CPU 60 advances the processing from S10 to S16.

In S11, the CPU 60 finds the center of gravity of the defective candidate objects to which the processing target label n specified in SO8 is affixed and discriminates region in which the found center of gravity exists among the four regions A–D within the image data in two color system.

In next S12, the CPU 60 sets the reference value Rd in accordance with the region discriminated in S11. More specifically, in case the discriminated region is the region A, the CPU 60 sets the reference value Rd as Sd. In case the discriminated region is the region B, the CPU 60 sets the reference value Rd as 2Sd. In case the discriminated region is the region C, the CPU 60 sets the reference value Rd as 4Sd. In case the discriminated region is the region D, the CPU 60 sets the reference value Rd as 8Sd.

In next S13, the CPU 60 measures area of the defective candidate object to which the processing target label n specified in SO8 is affixed. In other words, CPU 60 counts the total number of pixels which compose the defective candidate object. The CPU 60 may also measure graphic feature values other than area such as a maximum fillet diameter.

In next S14, the CPU 60 calculates the normalized value P indicating the normalized area of the defective candidate object to which the processing target label n is affixed by dividing the area of the defective candidate objects measured in S13 by the reference value Rd which was set in S12.

In next S15, the CPU 60 checks whether or not the normalized value P calculated in S14 is 0.5 or more. If the normalized value P is 0.5 or more, the CPU 60 adds the normalized value P calculated in S14 to the column corresponding to the dust (ds) and to the region discriminated in S11 in the classification table which is stored in the classification table storage region 62c in S21 and, thereafter, advances the processing to S26. On the other hand, in case it is judged in S15 that the normalized value P is less than 0.5, the CPU 60 advances the processing to S23.

On the other hand, in S16, the CPU 60 finds the center of gravity of the defective candidate object to which the processing target label n specified in SO8 is affixed, and discriminates the region in which the found center of gravity exists among the four regions A–D within the image data in a two color system.

In next S17, the CPU 60 sets the reference value Rk in accordance with the region discriminated in S16. More specifically, in case the discriminated region is the region A, the CPU 60 sets the reference value Rk as Sk. In case the discriminated region is the region B, the CPU 60 sets the reference value Rk as 2Sk. In case the discriminated region is the region C, the CPU 60 sets the reference value Rk as 4Sk. In case the discriminated region is the region D, the CPU 60 sets the reference value Rk as 8Sk.

In next S18, the CPU 60 measures an area of the defective candidate object to which the processing target label n specified in SO8 is affixed. In other words, the CPU 60 counts the total number of pixels which compose the defective candidate object. The CPU 60 may measure graphic feature values other than the area such as the maximum fillet diameter.

In next S19, the CPU 60 calculates the normalized value P indicating normalized area of the defective candidate object to which the processing target label n is affixed by dividing the area of the defective candidate objects measured in S18 by the reference value Rk set in S17.

In next S20, the CPU 60 checks whether or not the normalized value P calculated in S19 is 0.5 or more. If the normalized value P is 0.5 or more, the CPU 60 adds the normalized value P calculated in S19 to the column corresponding to scratch (k) and to the region discriminated in S16 in the classification table stored in the classification table storage region 62c in S22 and, thereafter, advances the processing to S26.

On the other hand, in case it is judged in S20 that the normalized value P is less than 0.5, the CPU 60 advances the processing to S23.

In S23, the CPU 60 checks whether or not two or more other defective candidate objects are strung within the specified interval from the defective candidate object to which the processing target label n specified in SO8 is affixed. In case two or more other defective candidate objects are not strung within the specified interval, the CPU 60 advances the processing directly to S26. On the contrary, in case two or more other defective candidate objects are strung within the specified interval, the CPU 60 multiplies the total number (that is, number of concentrated elements) of the defective candidate object to which the processing target level n specified in SO8 is affixed and the other defective candidate objects strung within the specified interval distance therefrom by 0.25 and adds the calculated product to the column corresponding to the concentration (m) and to the region discriminated in SO9 in the classification table stored in the classification table storage region 62c, in S24.

In next S25, the CPU 60 regards the labels given to the defective candidate objects decided as being strung within the specified interval in S23 as already specified. After completing S25, the CPU 60 advances the processing to S26.

In S26, the CPU 60 checks whether all labels n affixed in SO7 have been already specified or not. In case all labels are not yet specified, the CPU 60 returns the processing to SO8. On the other hand, if the specifying of all labels have been completed as a result of repeating the loop processing from SO8 to S26, the CPU 60 advances the processing to S27.

In S27, the CPU 60 calculates the values of the evaluation function F for the total of normalized values P described in each column of the classification table by the use of the above mentioned equations from (3) to (6).

In next S28, the CPU 60 checks whether or not the value of the evaluation function F calculated in S27 is less than the predetermined satisfactory or defective judgement reference value. In case the value of the evaluation function F is less than the satisfactory or defective judgement reference value, the CPU 60 judges in S29 that the inspection target optical member 14 is a satisfactory product, and outputs this effect (that is, image signal or voice signal to indicate that). On the other hand, in case the value of the evaluation function F is equal to or more than the satisfactory or defective judgement reference value, the CPU 60 judges in S30 that the inspection target optical member 14 is defective, and outputs this effect (that is, image signal or voice signal to indicate that). In either case, the CPU 60 terminates its control processing thereafter.

Effect of the Embodiments

In order to make it easy to understand, it is assumed that the defective candidate objects of only one type are formed in the region A and the region B of the inspection target optical member 14. In this case, the evaluation function F can be expressed by the following equation (7), $$F=(A^2+B^2)^{0.5} \tag{7}$$

where A is the total sum of normalized values P which are calculated for defective candidate objects caused by any kind of optical defects formed in the region A, and B is the total sum of normalized values P which are calculated for defective candidate objects caused by the same kind of optical defects formed in the region B. At this time, if the satisfactory or defective judgement reference value is assumed to be 1.2, the range of combinations of A and B at which the inspection target optical member 14 is judged as being satisfactory and the range of combinations of A and B at which the inspection target optical member 14 is judged as being defective can be discriminated as shown in FIG. 13.

Figure 13:
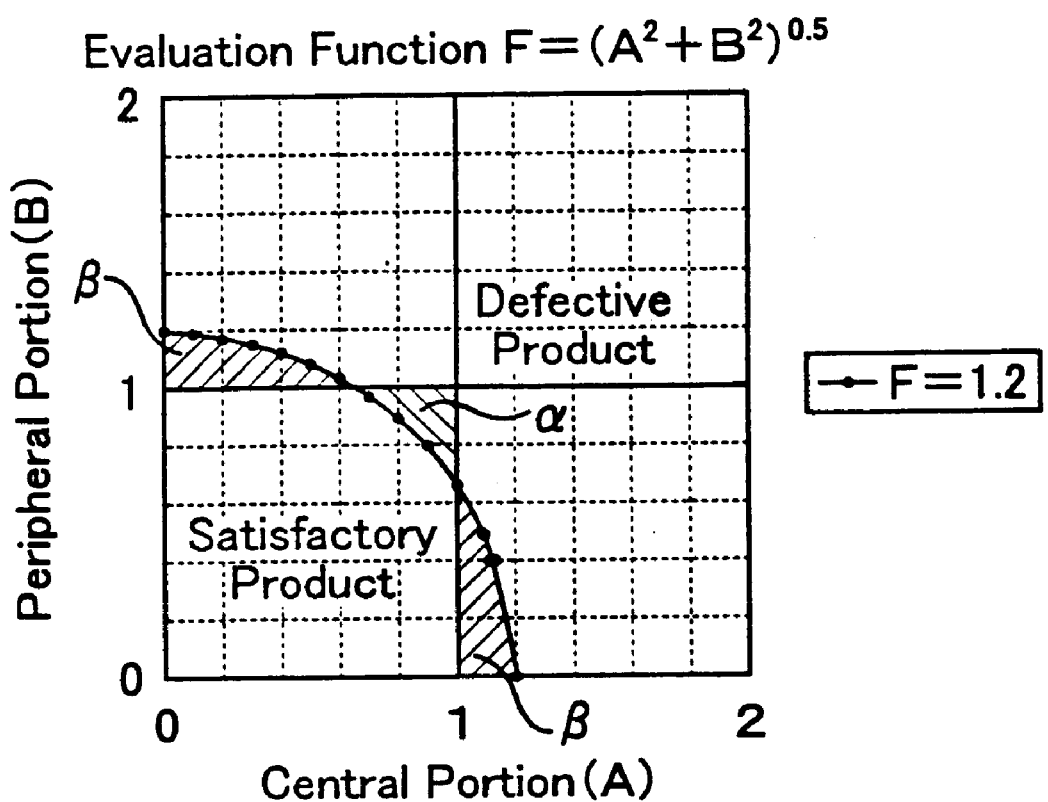
FIG. 13 is a graph showing evaluation function.

As obvious from this FIG. 13, in case the total sum of normalized values P corresponding to the region A and the total sum of normalized value P corresponding to the region B are both slightly smaller than 1 (in other words, in case they are applicable to the hatched portion α), the inspection target optical member 14 is judged as satisfactory according to the conventional evaluation method. However, if the inspection target optical member 14 is observed as a whole, it can be considered that its performance is lowered. From this standpoint, according to this embodiment, the inspection target optical member 14 is judged as defective because the value of the evaluation function F exceeds 1.2 which is the satisfactory or defective judgement reference value. On the contrary, in case the total sum of the normalized values P corresponding to the region A slightly exceeds 1 but the total sum of the normalized values P corresponding to the region B is close to 0, or in case the total sum of the normalized values P corresponding to the region B slightly exceeds 1 but the total sum of the normalized values P corresponding to the region A is close to 0 (in other words, in case they are applicable to the hatched portion β), the inspection target optical member 14 is judged as defective according to the conventional evaluation method. However, if the inspection target optical member 14 is observed as a whole, it can be regarded as satisfactory. From this standpoint, according to this embodiment, the inspection target optical member 14 is judged as satisfactory because the value of the evaluation function F is lower than 1.2 which is the satisfactory or defective judgement reference value.

In addition, the total sum of the above mentioned normalized values P is a value which is normalized to show the degree of influence of the defective candidate objects formed in various regions on the performance of the inspection target optical member 14. Thus, according to this Embodiment, the inspection target optical member 14 is evaluated as a whole, and points to show the satisfactory degree or defective degree can be obtained.

SECOND EMBODIMENT

In comparison with the first embodiment, the optical member inspection apparatus according to the second embodiment of the present invention is different only in construction in the host memory 62, and in the contents of control processing executed by CPU 60 in accordance with the image-processing program which is stored in the image-processing program storage region 62*d* of this host memory 62. The all other construction of the second embodiment are same as the first embodiment.

Figures 14A, 14B:
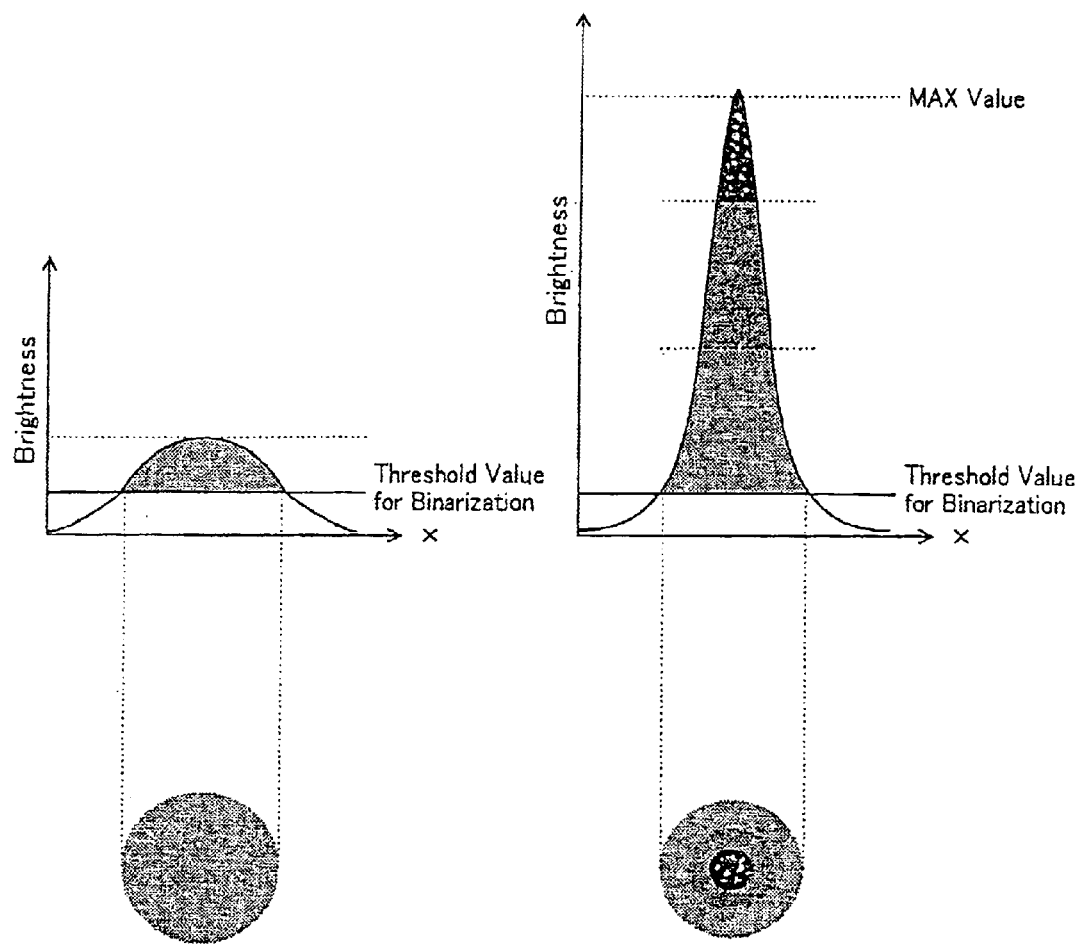
FIG. 14 is graphs that shows the differences in brightness between defective candidate objects having the same area.
Figure 15:
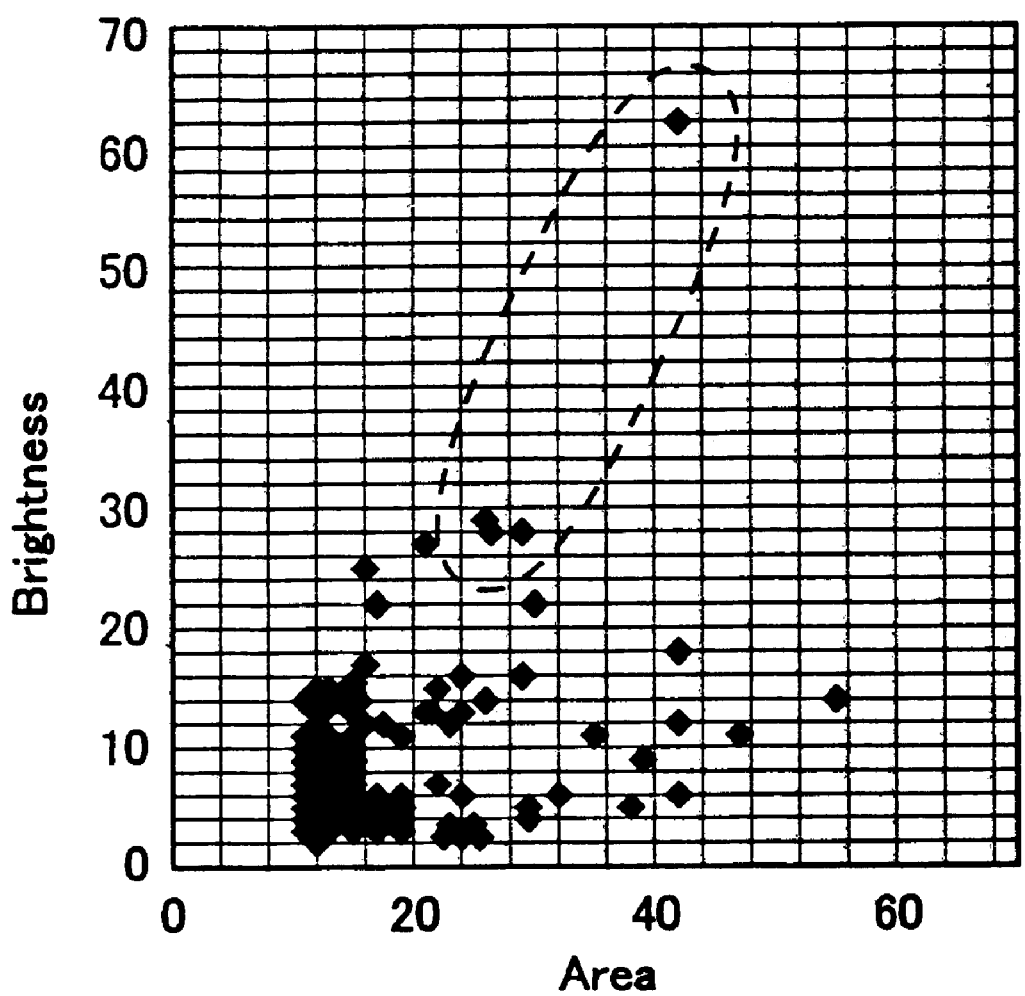
FIG. 15 is a graph that shows the distribution of the area and brightness value of each defective candidate object.

The reason why this second embodiment was designed is as follows. According to the above mentioned first embodiment, only areas of each defective candidate object extracted through the binarization process are normalized on the basis of the reference values Rk and Rd, and the judgement whether the inspection target optical member is satisfactory or defective is made on the basis of the normalized area. Thus, if comparison is made between defective candidate objects having same area, it is judged that the degrees of defect are the same, regardless of their brightness values. However, as shown in FIG. 14, if comparisons are made between defective candidate objects having same area, a defective candidate object having higher brightness is more significant than a defective candidate object having lower brightness, so that it may be judged that the degree of defect for the former is higher. From that viewpoint, among the various defective candidate objects of which brightness values and areas are distributed, as shown in FIG. 15, the ones with comparatively high brightness values (that is, the defective candidate objects within the range surrounded by broken lines in FIG. 15) should be calculated as relatively large normalized values P which are points indicating the degree of influence on performance of the inspection target optical member and which are the basis for the calculation of the evaluation function F. Therefore, the controller 6 of the optical member inspection apparatus according to this second embodiment calculates the normalized value P on the basis of not only the area of each defective candidate object but also the brightness thereof. Of course, the controller 6 normalizes the brightness of the defective candidate objects based on the reference values suitably set in accordance with the position of the defective candidate objects inside the inspection target optical member to calculate the normalized value P based on the brightness.

Hereinafter an explanation is made on the structure of the optical member inspection apparatus according to the second embodiment. However, explanation for the same construction as the first embodiment shall be omitted.

Figure 16:
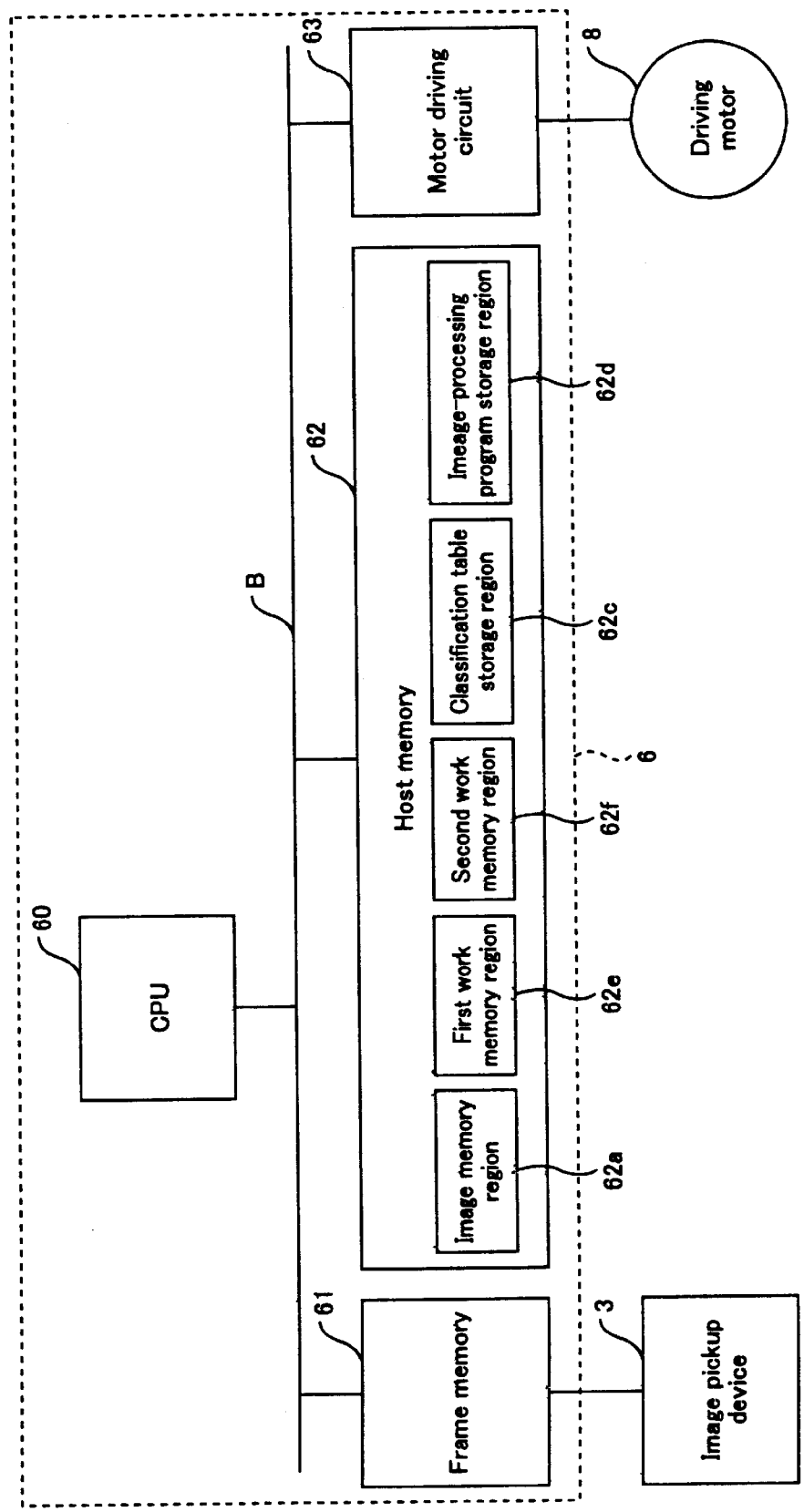
FIG. 16 is a block diagram that shows the internal circuit configuration of the controller for the optical member inspection apparatus according to the second embodiment of the present invention.

The optical member inspection apparatus according to the second embodiment possessing the construction shown in FIG. 1 is equipped with a controller 6 possessing the circuit configuration shown in FIG. 16. In comparison with the first embodiment shown in FIG. 3, the circuit configuration shown in FIG. 16 is different only in the point that two work memory regions (first work memory region 62*e* and second work memory region 62*f*) are formed in the host memory 62. This first work memory region 62*e* is the one to which the image data in polar coordinate system stored in the image memory region 62*a* is copied in a state in which its coordinate system is transformed from the polar coordinates to the rectangular coordinates. The second work memory region 62*f* is the one to which the image data in the rectangular coordinate system stored in the first work memory region 62*e* is copied and on which the copied image data undergoes binarization process in accordance with the predetermined threshold values to specify the positions of the defective candidate objects (that is, extracted objects which were extracted as a group of pixels having high brightness value) are formed.

The CPU 60 executes the image-processing program stored in image-processing program storage region 62*d* of the host memory 62, and periodically transforms the image data temporarily stored in the frame memory 61 to the image memory region 62*a* of the host memory 62. When the image data in the polar coordinate system corresponding to the whole inspection target optical member 14 is composed in the image memory region 62*a*, the CPU 60 performs the coordinate transformation on the image data and writes the image data of which coordinate system has been transformed to the rectangular coordinate system through the coordinate transformation into the first work memory region 62*e*. Next, the CPU 60 copies the image data in the rectangular coordinate system stored in the first work memory region 62*e* to the second work memory region 62*f* and performs the binarization process on the image data in the rectangular coordinate system copied in the second work memory 62*f* to extract the defective candidate objects. Next, the CPU 60 normalizes the area of each defective candidate object which has been extracted in accordance with its relative position in the image data and normalizes the average brightness value of the pixel at the same position as each defective candidate object in the image data in the rectangular coordinate system stored in the first work memory region 62e. Then, the CPU 60 calculates the normalized values P of the defective candidate objects by conducting the specified operation on the normalized areas and the brightness values,. Next, the CPU 60 classifies the normalized value P calculated for each defective candidate object in accordance with the various references described later on 1 and tabulates the classified normalized value P in the classification table stored in the classification table storage region 62c. After classification and tabulation on the normalized values P concerning all defective candidate objects are completed, the CPU 60 calculates the evaluation function F on the basis of the tabulation results. Lastly, the CPU 60 judges whether the inspection target optical member 14 is satisfactory or defective in accordance with whether or not the calculated evaluation function F exceeds the predetermined satisfactory or defective judgement reference value. Furthermore, the CPU 60 outputs an instruction for making the motor driving circuit 63 supply a drive current to the driving motor 8 synchronously with the receiving of the image data from the frame memory 61.

Principle of Quality Evaluation as to an Inspection Target Optical Member

Similar to the first Embodiment, the defective candidate objects extracted from the image data stored in the second work memory region 62f are classified in accordance with positions in which they are formed. As shown in FIG. 6, the inspection target optical member 14 is concentrically divided into 4 regions A–D of which centers are at a position equivalent to its optical axis.

The CPU 60 normalizes, for every defective candidate object formed in respective region A–D, the area of the defective candidate object by dividing its area by a reference value R1 which is dedicatedly prepared for the region where the defective candidate object is formed. Furthermore, the CPU 60 normalizes, for every regions, the average value of the brightness or the entire pixels contained in the range which overlaps with each defective candidate objects stored in the first work memory 62e by dividing the average value by a reference value R2 which is dedicatedly prepared for the region. Furthermore, the CPU 60 calculates the normalized value P which shows the degree of influence of optical defects corresponding to the defective candidate object on the performance of the inspection target optical member by calculating the square root of sum of squares of the normalized area and the normalized average brightness value, in accordance with the following equation (8).

$$P = ((Area/R1)^2 + (Average\ Brightness/R2)^2)^{0.5} \quad (8)$$

More specifically, in case the reference value R1 for areas which should be applied to the region A is set to "S," the CPU 60 applies "2S" as reference value R1 for areas to the region B, and applies "4S" as reference value R1 for areas to the region C, and applies "8S" as reference value R1 for areas to the region D. In a similar way, in case the reference value R2 for the average brightness which should apply to the region A is set to "L," the CPU 60 applies "2L" as reference value R2 for average brightness to the region B, and applies "4L" as reference value R2 for average brightness to the region C, and applies "8L" as reference value R2 for average brightness to the region D. In other words, the CPU 60 applies both reference values R1 and R2 so that their magnitude becomes large as the position of the defective candidate object becomes remote from the position equivalent to the optical axis of the inspection target optical member 14. Since the square root of sum of squares of both the normalized area and the normalized average brightness thus give the normalized value P, even if the area is comparatively small, the normalized value P becomes large in case the brightness is very high. On the contrary, even if the average brightness is comparatively low, the normalized value P becomes large in case the area is very large.

Furthermore, as for reference values R1 and R2, reference values R1k and R2k are respectively applied in case defective candidate objects are caused by scratch, and reference values R1d and R2d are respectively applied in case defective candidate objects are caused by dust. These reference values R1k and R2k, R1d and R2d are different from one another. Therefore, if the reference value R1k applied to the area of the defective candidate objects caused by scratch and formed in the region A is "Sk" and the reference value R1d applied to the area of the defective candidate objects caused by dust and formed in the region A is. "Sd" the values of "Sk" and "Sd" becomes different from each other. In a similar way, if the reference value R2k applied to the average brightness of the defective candidate objects caused by scratch and formed in the region A is. "Lk" and the reference value R2d applied to the average brightness of the defective candidate objects caused by dust and formed in the region A is "Ld," the values of "Lk" and "Ld" becomes different from each other. Therefore, prior to the calculation of the normalized value P, the CPU 60 judges whether defective candidate object of the processing target is caused by a scratch or by dust. This judgement is conducted by the use of the threshold function shown in FIG. 9. The CPU 60 decides the reference values Rk or Rd and Lk or Ld in accordance with the judged result, that is, classification of scratch or dust and the region in which the defective candidate object of processing target is formed. Based on each reference value Rk or Rd, and Lk or Ld thus decided, the calculation of the above mentioned normalized value P is performed.

Next, if the normalized value P of the defective candidate object of processing target calculated in the aforementioned manner is 0.5 or more, the CPU 60 adds the normalized value P into the column of the classification table stored in classification table storage region 62c which corresponds to the classification of the judged dust (ds) or scratch (k) and to the regions A–D in which the defective candidate object of processing target is formed.

On the other hand, in case the calculated normalized value P of the defective candidate object of processing target is less than 0.5, the CPU 60 searches for another defective candidate objects within the specified distance from the defective candidate object of processing target. In case another defective candidate objects are found, the CPU 60 further searches for different defective candidate object within the specified interval. The CPU 60 continues the operation until no more defective candidate object can be found within the specified distance after the final defective candidate object is found. In case the number of the defective candidate objects which are close to one another within the specified interval searched in this way amount to three or more, the CPU 60 adds a point calculated by multiplying the number of the defective candidate objects by 0.25 to the column of the classification table which corresponding to concentration (m) and to the region A–D in which the defective candidate object of processing target is formed.

When the above mentioned additions of the normalized value P to the classification table are conducted for all of the defective candidate objects, as similar to the above mentioned first embodiment, the CPU 60 calculates the evaluation function F by using the above mentioned (3)~(6), based on each normalized value P written into each column of the classification table, and judges whether the inspection target optical member 14 is defective or satisfactory in accordance with the calculated evaluation function F.

Control Processing

Figure 17:
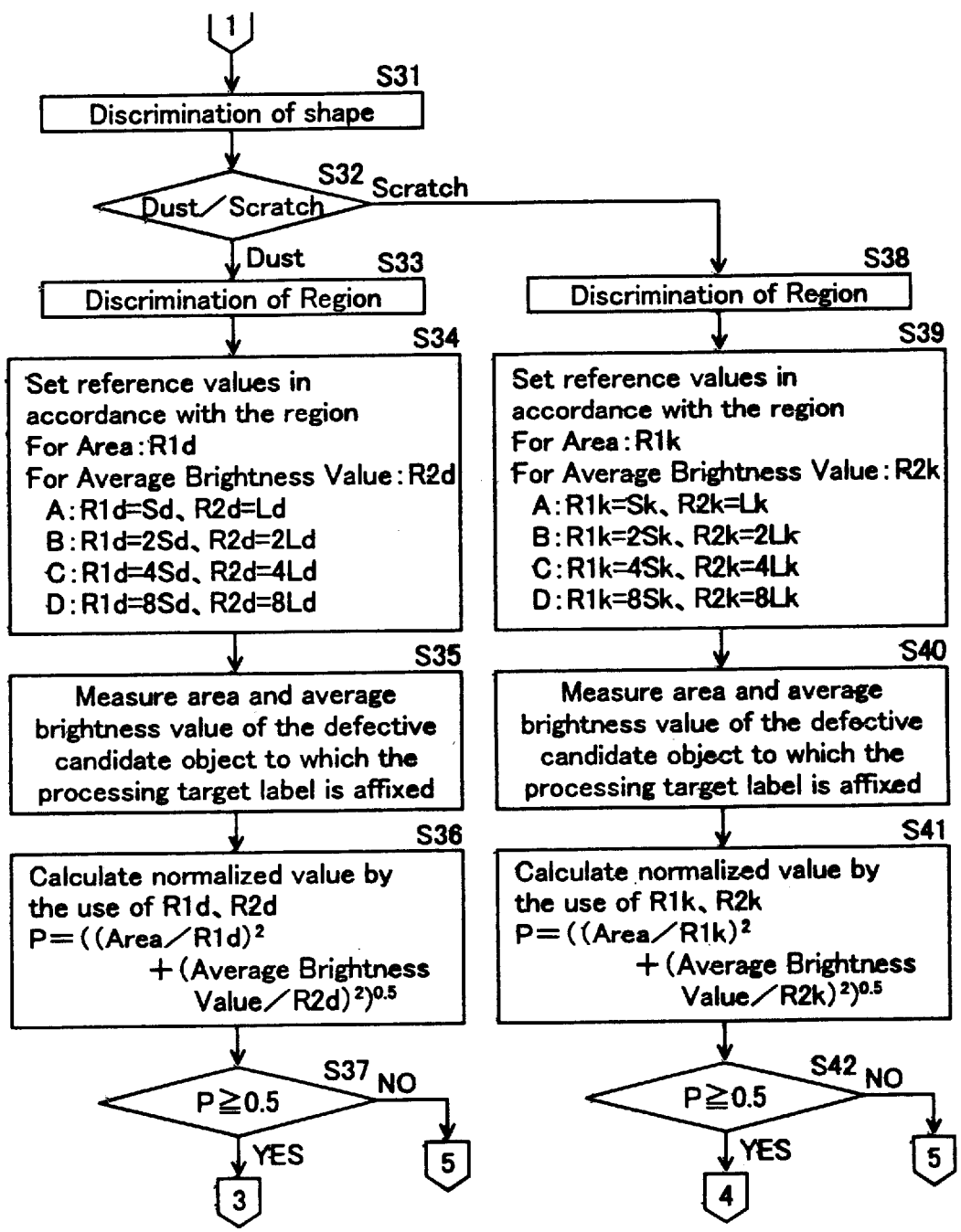
FIG. 17 is a flow chart that shows control processing executed with a CPU in the second embodiment of the present invention.

Next, an explanation is given on the contents of control processing in the second embodiment which is executed by the controller 6 (CPU 60) in accordance with the image-processing program read out from the image-processing program storage region 62d. In the control processing in the second embodiment, in place of S09 through S20 (FIG. 11) in the control processing of the first embodiment shown in FIG. 10 through FIG. 12, S31 through S42 shown in FIG. 17 are executed. In other words, the CPU 60 executes processing of SO1 through SO8 shown in FIG. 10, and when completing the SO8, advances the processing to S31 shown in FIG. 17. In this S31, the CPU 60 judges in the above mentioned way whether a defective candidate object to which the processing target label n specified in SO8 is affixed is caused by dust or by scratch. In case it is judged that the defective candidate object is caused by dust, the CPU 60 advances the processing from S32 to S33. On the contrary, in case it is judged that the defective candidate object is caused by scratch, the CPU 60 will advance the processing from S32 to S38.

In S33, the CPU 60 finds the center of gravity of the defective candidate object to which the processing target label n specified in SO8 is affixed and discriminates region where the found center of the gravity exists among the four regions A–D within the image data in two color system.

In next S34, the CPU 60 sets the reference value R1d for the area and the reference value R2d for the average brightness corresponding to the region which is discriminated in S33. More specifically, in case the discriminated region is the region A, the CPU 60 sets Sd as reference value R1d for area, and Ld as reference value R2d for average brightness, respectively. In case the discriminated region is the region B, the CPU 60 sets 2Sd as reference value R1d for area, and 2Ld as reference value R2d for average brightness, respectively. In case the discriminated region is the region C, the CPU 60 sets 4Sd as reference value R1d for area, and 4Ld as reference value R2d for average brightness, respectively. In case the discriminated region is the region D, the CPU 60 sets 8Sd as reference value R1d for area, and 8Ld as reference value R2d for average brightness.

In next S35, the CPU 60 measures an area of the defective candidate object to which the processing target label n specified in SO8 is affixed. In other words, the CPU 60 counts the total number of pixels that compose the defective candidate object. The CPU 60 may also measure graphic feature value other than area such as the maximum fillet diameter.

At the same time, the CPU 60 specifies the position of pixels which compose the defective candidate object to which the processing target label n specified in SO8 is affixed, reads out the brightness values of all pixels of the image data stored in the first work memory region 62e, which exist in positions corresponding to the specified position in the image data in two color system and calculates the average value of the brightness values which are read out.

In next S36, the CPU 60 divides the area of the defective candidate object which have been measured in S35 by the reference value R1d for area that has been set in S34, divides the average brightness value calculated in S35 by the reference value R2d for average brightness set in S34, and calculates the square root of sum of squares of quotients of the divisions as normalized value P of the defective candidate object, in accordance with the following equation (8-1).

$$P=((Area/R1d)^2+(Average\ Brightness/R2d)^2)^{0.5} \quad (8\text{-}1)$$

In next S37, the CPU 60 checks whether or not the normalized value P calculated in S36 is 0.5 or more. If the normalized value P is 0.5 or more, the CPU 60 advances the processing to S21 shown in FIG. 12, and if the normalized value P is less than 0.5, the processing is advanced to S23 shown in FIG. 12.

On the other hand, in S38, the CPU 60 finds the center of gravity of the defective candidate object to which the processing target label n specified in SO8 is affixed and discriminates region in which the found center of the gravity exists among the four regions A–D within the image data in two color system.

In next S39, the CPU 60 sets the reference value R1k for the area and the reference value R2k for average brightness corresponding to the region which is discriminated in S38. More specifically, in case the discriminated region is the region A, the CPU 60 sets Sk as the reference value R1k for area and Lk as the reference value R2k for average brightness, respectively. In case the discriminated region is the region B, the CPU 60 sets 2Sk as the reference value R1k for area and 2Lk as the reference value R2k for average brightness respectively. In case the discriminated region is the region C, the CPU 60 sets 4Sk as the reference value R1k for area and 4Lk as the reference value R2k for average brightness, respectively. In case the discriminated region is the region D, the CPU 60 sets 8Sk as the reference value R1k for area and 8Lk as the reference value R2k for average brightness, respectively.

In next S40, the CPU 60 measures the area of the defective candidate object to which the processing target label n specified in SO8 is affixed. In other words, the CPU 60 counts the total number of pixels that compose the defective candidate object. The CPU 60 may also measure graphic feature values other than area such as the maximum fillet diameter. At the same time, the CPU 60 specifies the position of each pixel which composes the defective candidate object to which the processing target label n specified in SO8 is affixed, reads out the brightness value of all pixels of the image data stored in the first work memory region 62e which exist in positions corresponding to the specified portions in the image data in two color system and calculates average value of the brightness value which are read out.

In next S41, the CPU 60 divides the area of defective candidate object measured in S40 by the reference value R1k for area set in S39, divides the average brightness value calculated in S40 by the reference value R2k for average brightness set in S39, and calculates the square root of sum of squares of quotations of the division as the normalized value P of the defective candidate object, in accordance with the following equation (8-2).

$$P=((Area/R1k)^2+(Average\ Brightness/R2k)^2)^{0.5} \quad (8\text{-}2)$$

In next S42, the CPU 60 checks whether or not the normalized value P calculated in S41 is 0.5 or more. If the normalized value P is 0.5 or more, the CPU 60 advances the processing to S22 of FIG. 12. In case the normalized value P is less than 0.5, the processing is advanced to S23 of FIG. 12. The processing after the above mentioned S21, S22, and S23 is the same as that for the aforementioned first embodiment, so their explanation is omitted.

Effect of Embodiment

Figure 18:
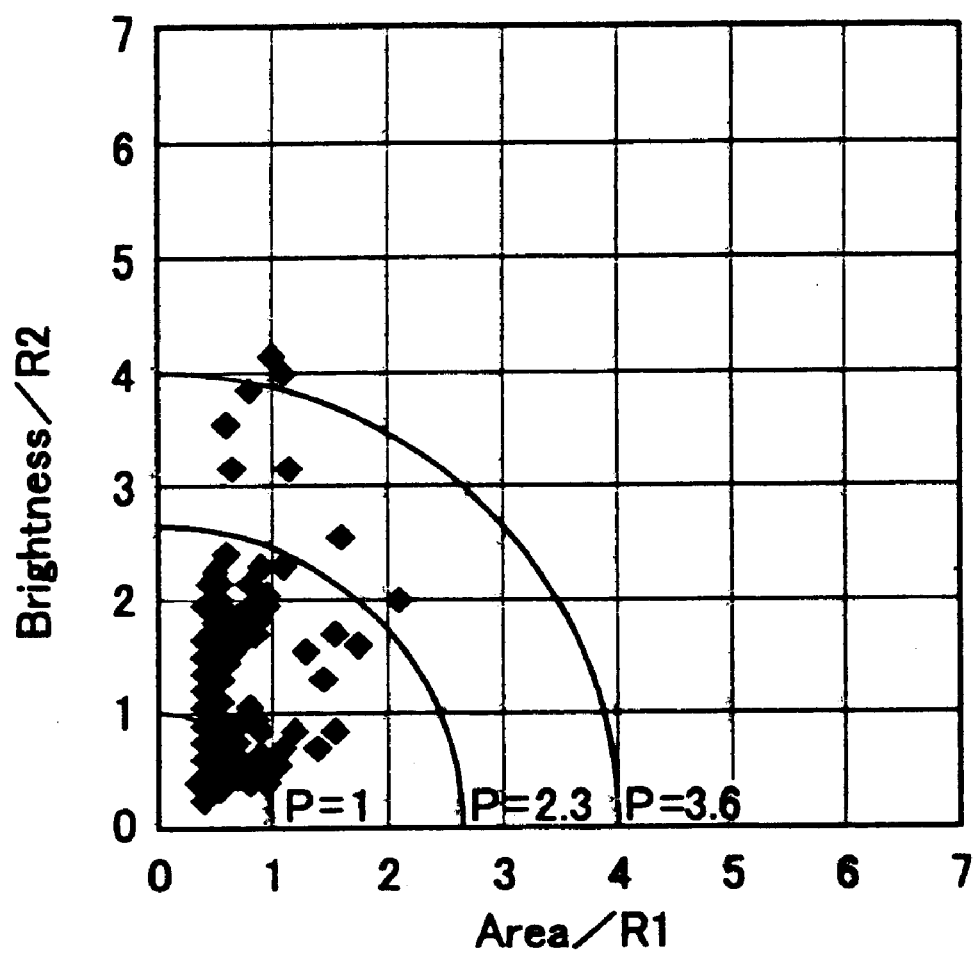
FIG. 18 is a graph that shows the distribution of normalized values.

FIG. 18 is a graph which shows the distribution of the area and the average brightness value (that is, area and brightness after dividing by each reference value R1d and R2d) of defective candidate objects caused by dust and extracted from the region A, at the time a certain inspection target optical member 14 was inspected. Each arc indicated in FIG. 18 shows the range in which the normalized values P calculated in relation to defective candidate objects become 1, 2.7, and 4, respectively. As it is obvious from this FIG. 18, even if defective candidate objects have the same area, the normalized value P which are calculated for them become different from each other, depending on the average brightness value. Thus, in the optical member inspection apparatus according to the second embodiment, an evaluation function F further reflects the actual "degree of significance" of the defective candidate objects in the inspection target optical member 14.

Modified Embodiment

According to the second embodiment, the average values of the brightness values of the defective candidate objects were calculated in S35 and S40. However, the maximum brightness value of the defective candidate objects may be obtained through the MAX operation. In this case, in the calculation of normalized value P at S36 and S41, the reference value for maximum brightness is used in place of the reference values R2d and R2k for average brightness. The reference value for maximum brightness is set in S34 of S39 as a value which is larger than the reference values R2d and R2k for average brightness value.

THIRD EMBODIMENT

In comparison with the above mentioned second embodiment, the optical member inspection apparatus according to the third embodiment of the present invention is different only in the content of control processing executed by CPU 60 in accordance with the image-processing program stored in image-processing program storage region 62d of the host memory 62. The remaining construction of the third embodiment are same as the second embodiment.

Principle of Quality Evaluation as to an Inspection Target Optical Member

Similar to the above-mentioned first embodiment, the CPU 60 controls of each part of the optical member inspection apparatus, transforms the coordinate system of the image data obtained by picking up the image of the inspection target optical member 14, from polar coordinate system to rectangular coordinate system, and copies the image data formed on the first work memory region 62e through the coordinate transformation to the second work memory region 62f. Subsequently, the CPU 60 compares the brightness value of each pixel which composes the image data copied to the second work memory region 62f with the predetermined threshold value. According to a result of the comparison, the CPU 60 performs binarization processing by rewriting brightness values of the pixels originally exceeding the threshold values to "255" and rewriting brightness values of the pixels originally lower than the threshold value to "0.", so that the defective candidate objects are extracted.

Similar to the first embodiment, the defective candidate objects extracted through the binarization process are classified in accordance with the positions in which they are formed. As shown in FIG. 6, the inspection target optical member 14 is concentrically divided into 4 regions A–D of which centers are at the position equivalent to its optical axis.

The CPU 60 calculates normalized value P, for every defective candidate object formed in respective region A–D, by multiplying the area of the defective candidate object by the average brightness value of the entire pixels contained in the range which overlaps with each defective candidate objects in the first work memory 62e, and by dividing the product by the reference value R3, in accordance with the following equation (9).

$$P = (Area \times Average\ Brightness)/R3 \qquad (9)$$

More specifically, in case reference value R3 applicable to the region A is "SL," the CPU 60 applies "2SL" as reference value R3 for the region B, applies "4SL" as reference value R3 for the region C, and applies "8SL" as reference value R3 for the region D. In other words, CPU 60 sets the reference value R3 so that its magnitude becomes large as the position of the defective candidate object becomes remote from the position equivalent to the optical axis of the inspection target optical member 14. Since the normalized value P is calculated by dividing the product of area and average brightness by the reference value R3, even if the area is comparatively small, normalized value P becomes large in case the average brightness value is very high. On the contrary, even if the average brightness is comparatively low, the normalized value P becomes large in case the area is very large.

Furthermore, as reference value R3, the reference value R3k is applied in case the defective candidate objects are caused by scratch and the reference value R3d is applied in case the defective candidate objects are caused by dust. These reference values R3k and R3d are different from each other. Therefore, if the reference value R3k applied to the area of the defective candidate objects caused by scratch and formed in the region A is "SLk" and the reference value R3d applied to the area of the defective candidate objects caused by dust and formed in the region A is "SLd," the values of SLk and SLd becomes different from each other. Therefore, prior to the calculation of the normalized value P, the CPU 60 judges whether the defective candidate object of the processing target is caused by scratch or by dust. This judgement is performed by using the threshold function shown in FIG. 9. Then, the CPU 60 decides the reference value R3k or R3d in accordance with the judged classification of scratch or dust and the region in which the defective candidate object of processing target is formed. Based on the reference value R3k or R3d thus decided, the calculation of the above mentioned normalized value P is performed.

Next, in case the normalized value P of the defective candidate object of processing target calculated in the aforementioned manner is 0.5 or more, the CPU 60 adds the normalized value P into the column of the classification table stored in the classification table storage region 62c which corresponds to the classification of the judged dust (ds) or scratches (k) and to the regions A–D in which the defective candidate objects is formed.

On the other hand, in case the calculated normalized value P of the defective candidate object of processing target is less than 0.5, the CPU 60 searches for another defective candidate objects within the specified interval from the defective candidate object of processing target. In case defective candidate objects are found in this way, the CPU 60 further searches for different defective candidate object within the specified distance. The CPU 60 continues that operation until no more defective candidate object can be found within the specified interval after the final defective candidate object is found. In case the number of the defective candidate objects which are close to one another within the specified interval amounts to 3 or more, the CPU 60 adds the points calculated by multiplying the number of the defective candidate objects by 0.25 to the column of the classification table which corresponds to concentration (m) and to the region A–D in which the defective candidate object of processing target is formed.

When the above mentioned additions of the normalized value P to the classification table are conducted for all of the defective candidate objects, as similar to the case of the above mentioned first embodiment, the CPU 60 calculates the evaluation function F by using the aforementioned (3)~(6), based on each normalized value P written into each column of the classification table, and judges whether the inspection target optical member 14 is satisfactory or defective in accordance with the calculated evaluation function F.

Control Processing

Figure 19:
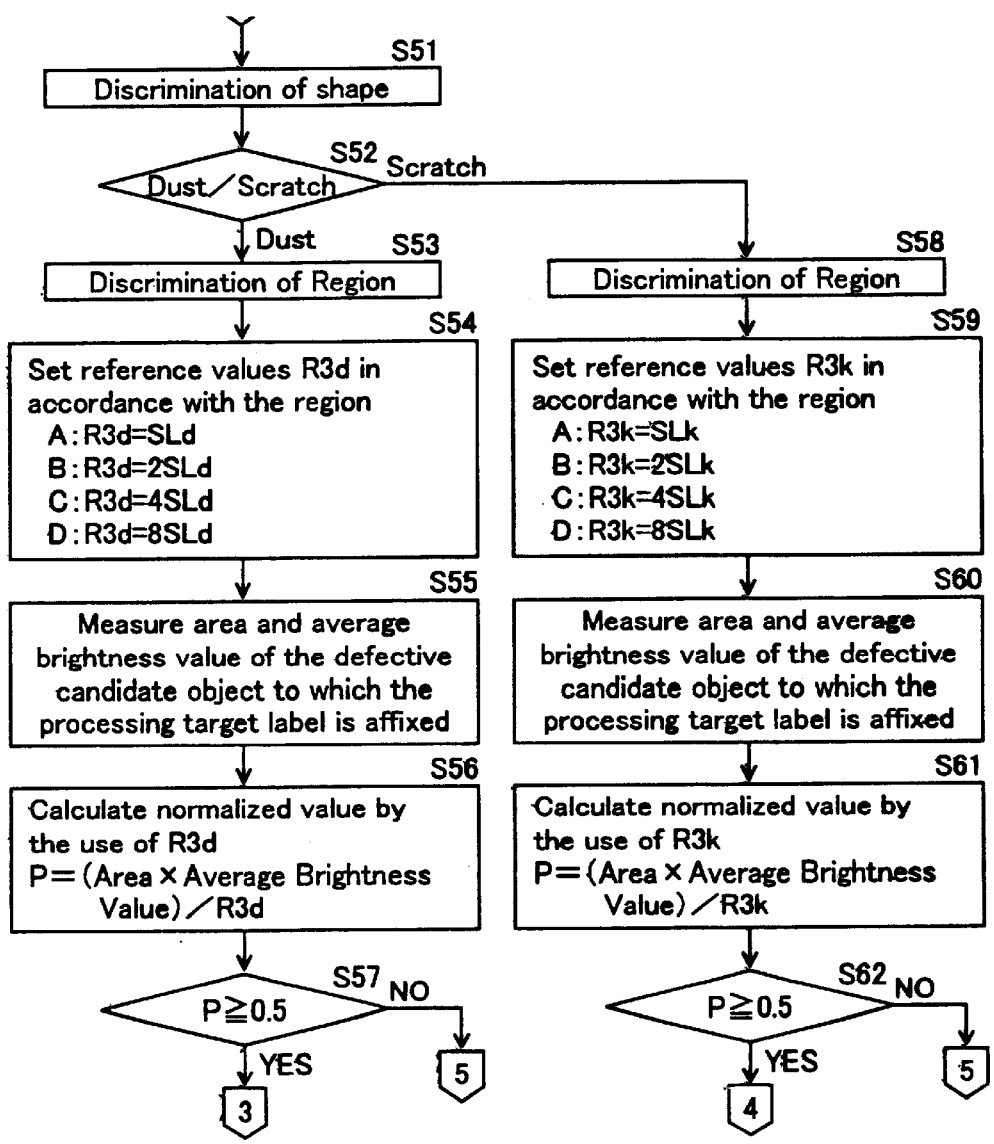
FIG. 19 is a flow chart that shows the control processing executed in the third embodiment of the present invention.

Next, an explanation is given on the contents of control processing which is executed by the controller 6 (CPU 60) in accordance with the image-processing program read out from the image-processing program storage region 62d. In the control processing in the third embodiment, in place of S09 through S20 (FIG. 11) in the control processing of the first embodiment shown in FIG. 10 through FIG. 12, S51 through S62 shown in FIG. 19 is executed. In other words, the CPU 60 executes processing of S01 through S08 shown in FIG. 10, and when completing the S08, advances the processing to S51 shown in FIG. 19. In this S51, the CPU 60 judges in the aforementioned manner whether a defective candidate object to which the processing target label specified in S08 is affixed is caused by dust or by scratch. In case it is judged that the defective candidate object is caused by dust, the CPU 60 advances the processing from S52 to S53. On the contrary, in case it is judged that the defective candidate object is caused by scratch, the CPU 60 advances the processing from S52 to S58.

In S53, the CPU 60 finds the center of gravity of the defective candidate object to which the processing target label n specified by S08 is affixed and discriminates the region in which the found center of gravity exists among the four regions A–D within the image data in a two color system.

In next S54, the CPU 60 sets the reference value R3d in accordance with the regions discriminated in S53. More specifically, in case the discriminated region is the region A, the CPU 60 sets SLd as the reference value R3d. In case the discriminated region is the region B, the CPU 60 sets 2SLd as the reference value R3d. In case the discriminated region is the region C, the CPU 60 sets 4SLd as the reference value R3d. In case the discriminated region is the region D, the CPU 60 sets 8SLd as the reference R3d.

In next S55, the CPU 60 measures area of the defective candidate object to which the processing target label n specified in S08 is affixed. In other words, the CPU 60 counts the total number of pixels which compose the defective candidate object. The CPU 60 may also measure graphic feature value other than area such as the maximum fillet diameter. At the same time, the CPU 60 specifies the position of each pixel which composes the defective candidate object to which the processing target label n specified in S08 is affixed, reads out the brightness values of all pixels of the image data stored in the first work memory region 62e, which exist in positions corresponding to the specified positions in the image data in two color system, and calculates the average value of the brightness values which are read out.

In next S56, the CPU 60 multiplies the area of the defective candidate object measured in S55 by the average brightness value calculated in S55, and divides the product result by the reference value R3d set in S54 to calculate the normalized value P in accordance with the following equation 99-1)

$$P=(\text{Area}\times\text{Average Brightness})/R3d \quad (9\text{-}1)$$

In next S57, the CPU 60 checks whether or not the normalized value P calculated in S56 is 0.5 or more. In case the normalized value P is 0.5 or more, the CPU 60 advances the processing to S21 shown in FIG. 12, and in case the normalized value P is less than 0.5, the processing advances to S23 shown in FIG. 12.

On the other hand, in S58, the CPU 60 finds the center of gravity of the defective candidate object to which the processing target label n specified in S08 is affixed and discriminates region in which the found center of gravity exists among the four regions A–D within the image data in two color system.

In next S59, the CPU 60 sets the reference value R3k in accordance with the region which is discriminated in S58. More specifically, in case the discriminated region is the region A, the CPU 60 sets SLk as the reference value R3k. In case the discriminated region is the region B, the CPU 60 sets 2SLk as the reference value R3k. In case the discriminated region is the region C, the CPU 60 sets 4SLk as the reference value R3k. In case the discriminated region is the region D, the CPU 60 sets 8SLk as the reference value R3k.

In next S60, the CPU 60 measures an area of defective candidate object to which the processing target label n specified in S08 is affixed. In other words, the CPU 60 counts the total number of pixels which compose the defective candidate object. The CPU 60 may also measure graphic feature value other than area such as the maximum fillet diameter. At the same time, the CPU 60 specifies the position of each pixel which composes the defective candidate object to which the processing target label n specified in S08 is affixed, reads out the brightness values of all pixels of the image data stored in the first work memory region 62e, which exist in positions corresponding to the specified position in the image data in two color system, and calculates average value of the brightness values which are read out.

In next S61, the CPU 60 multiplies the area of the defective candidate object measured in S60 by the average brightness value calculated in S60, divides the product result by the reference value R3k set in S59 to calculate the normalized value P in accordance with the following equation (9-2).

$$P=(\text{Area}\times\text{Average Brightness})/R3k \quad (9\text{-}2)$$

In next S62, the CPU 60 checks whether or not the normalized value P calculated in S61 is 0.5 or more. If the normalized value P is 0.5 or more, the CPU 60 advances the processing to S22 shown in FIG. 12, and if the normalized value P is less than 0.5, the CPU 60 advances the processing to S23 shown in FIG. 12. The processing after these S21, S22, and S23 is exactly the same as the above-mentioned first embodiment, so the explanation is omitted.

Effect of Embodiment

Figure 20:
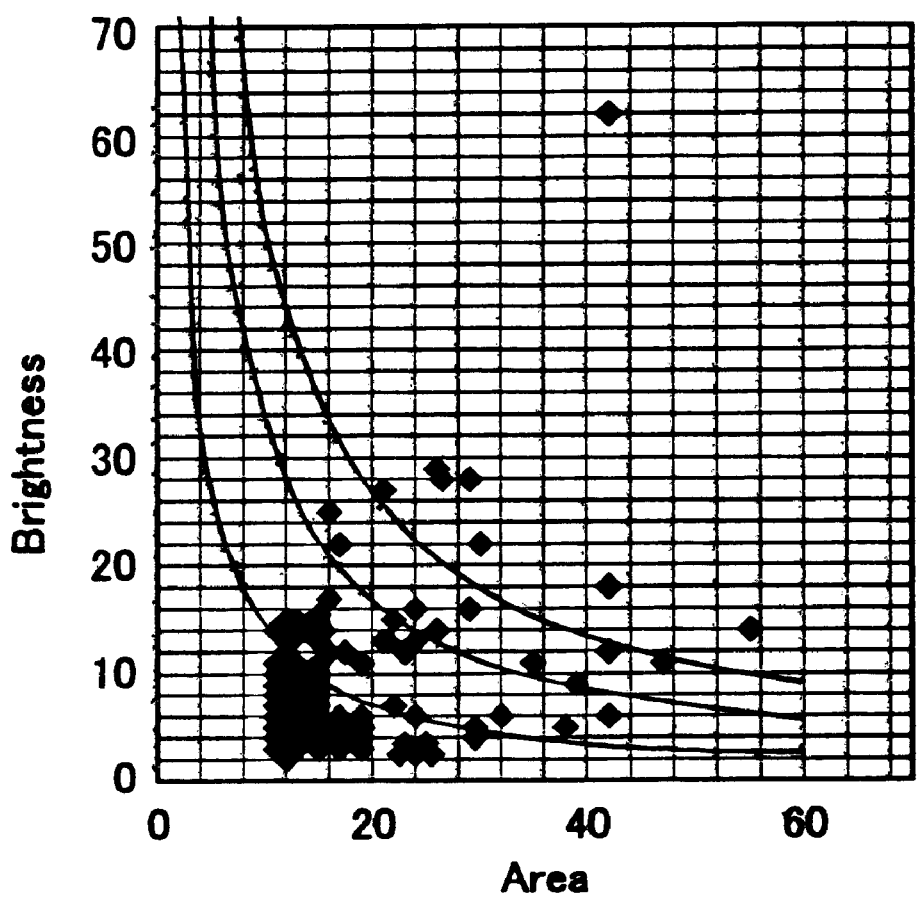
FIG. 20 is a graph that shows the distribution of the normalized values.

FIG. 20 is a graph which shows the distribution of area and average brightness value of defective candidate objects caused by dust and extracted from the region A at the time a certain inspection target optical member 14 was inspected. Each hyperbolic curve drawn in FIG. 20 indicates the range in which the normalized values P calculated for such defective candidate objects become 1, 2.3, and 3.6, in case the reference value SLd is 150. As it is obvious from this FIG. 20, even if the defective candidate objects have the same area, the normalized values P which are calculated for them become different from each other, depending on the average brightness value. Therefore, in the optical member inspection apparatus according to the second embodiment, an evaluation function F further reflects the actual "degree of significance" of defective candidate objects in the inspection target optical member 14.

Modified embodiment

According to the third embodiment, the average values of the brightness values of the defective candidate objects were calculated in S55 and S60. However, the maximum brightness value of the defective candidate objects may be obtained through the MAX operation. In this case, the reference values R3d and R3k which are used for calculating normalized value P at S56 and S61 are set as the larger values.

In the optical member inspection apparatus, image-processing apparatus, image-processing method, and computer readable media constructed according to present invention, it can numerically express overall defective or satisfactory degree of the inspection target optical members, by putting the position in which each defective candidate object is formed into consideration and by evaluating the influence of each defective candidate object on the whole performance of the inspection target optical member.

What is claimed is:

1. An optical member inspection apparatus, comprising:
    an image pick-up device which picks up an image of an inspection target optical member, and outputs image data representing said image of the inspection target optical member;
    an extraction processor which extracts, from the image data, a portion of the image having brightness different from other portions of the image, as an extracted object;
    a graphic feature value measuring processor which measures a graphic feature value of the extracted object;
    a position measuring processor which measures a position of the extracted object in the image data relative to an optical axis of said inspection target optical member;
    a normalization processor which normalizes the graphic feature value using a reference based on the position of the extracted object such that the graphic feature value of the extracted object is weighted with a distance between the position of the extracted object and the optical axis of said inspection target optical member so that the graphic feature value becomes heavier as the distance decreases; and
    an operation processor which calculates an evaluation function based on all normalized values calculated by the normalization processor for all extracted objects extracted from the image data by the extraction processor.

2. An optical member inspection apparatus according to claim 1, wherein said image pick-up device generates diffused light from an optical defect of the inspection target optical member by illuminating the inspection target optical member from a position offset from an optical axis of the optical member, such that a defect in said optical member appears brighter than adjacent sections of said optical member.

3. An optical member inspection apparatus according to claim 1, wherein said extraction processor compares a brightness value of each pixel of image data with a predetermined threshold value to transform the brightness value into a one bit binary value.

4. An optical member inspection apparatus according to claim 1, wherein said graphic feature value measuring processor measures an area of each extracted object.

5. An optical member inspection apparatus according to claim 1, wherein said normalization processor sets the reference higher as a distance between the extracted object and the optical axis of the inspection target optical member increases.

6. An optical member inspection apparatus according to claim 1, further comprising a judgement processor which judges that the inspection target optical member is defective when the evaluation function calculated by the operation processor exceeds a predetermined judgement reference value.

7. An optical member inspection apparatus according to claim 1, wherein said graphic feature value measuring processor measures an area and a brightness of each extracted object.

8. An optical member inspection apparatus according to claim 1, wherein said position measuring processor measures a position of the center of gravity of each extracted object.

9. An optical member inspection apparatus, comprising:
    an image pick-up device which picks up an image of an inspection target optical member, and outputs image data representing said image of the inspection target optical member;
    an extraction processor which extracts, from the image data, a portion of the image having brightness different from other portions of the image, as an extracted object;
    a graphic feature value measuring processor which measures a graphic feature value of the extracted object;
    a position measuring processor which measures a position of the extracted object in the image data;
    a normalization processor which normalizes the graphic feature value using a reference based on the position of the extracted object; and
    an operation processor which calculates an evaluation function based on all normalized values calculated by the normalization processor for all extracted objects extracted from the image data by the extraction processor,
    wherein said normalization processor setting the reference higher as a distance between the extracted object and the optical axis of the inspection target optical member increases,
    wherein said position measuring processor measures the position of the extracted object by discriminating a region from which the extracted object is extracted among a plurality of concentric regions centered on said optical axis, and wherein said normalization processor sets the reference based on the region discriminated by the position measuring processor.

10. An optical member inspection apparatus according to claim 9, wherein said operation processor calculates, for each said concentric region, a total of the normalized values, and calculates a square root of a sum of squares of each of said totals.

11. An optical member inspection apparatus according to claim 10, wherein said operation processor classifies the extracted objects in accordance with a plurality of types of optical defects which can cause the extracted objects, calculates, for each said concentric region and each of said plurality of types, a total of the normalized values, and calculates, for each of said plurality of types, a square root of a sum of squares of the totals, and calculates a square root of sum of the squares of the square roots calculated for each of said plurality of types.

12. An optical member inspection apparatus according to claim 11, wherein said operation processor discards normalized values below a predetermined level, unless at least a predetermined number of other extracted objects having a normalized value below said predetermined level are within a predetermined interval from the extracted object.

13. An optical member inspection apparatus according to claim 12, wherein said operation processor calculates a product of the number of said extracted objects having a normalized value below said predetermined level within the predetermined interval from other extracted objects, the number being larger than the predetermined number, and a constant as a normalized value for all of said extracted objects within the predetermined interval, and classifies the result independently from other types of optical defects.

14. An image-processing apparatus, comprising:
- an extraction processor which extracts, from an image data representing an inspection target optical member, a portion of said image data indicating an extracted object of said optical member having a brightness different from surrounding areas of said optical member;
- a graphic feature value measuring processor which measures a graphic feature value of the extracted object;
- a position measuring processor which measures a position of the extracted object in the image data relative to an optical axis of said inspection target optical member;
- a normalization processor which calculates a normalized value of the extracted object, by normalizing the graphic feature value using a reference based on the position measured by the position measuring processor such that the graphic feature value of the extracted object is weighted with a distance between the position of the extracted object and the optical axis of said inspection target optical member so that the graphic feature value becomes heavier as the distance decreases; and
- an operation processor which calculates an evaluation function based on all normalized values calculated by the normalization processor with respect to all extracted objects which are extracted from said image data by the extraction processor.

15. An image-processing method, comprising:
- extracting, from image data representing an inspection target optical member, an extracted object comprising a portion of said optical member having a brightness different from a surrounding area of said optical member in the image data;
- measuring a graphic feature value of the extracted object;
- measuring a position of the extracted object in the image data relative to an optical axis of the inspection target optical member;
- calculating a normalized value of the extracted object, by normalizing the graphic feature value using a reference in accordance with the position of the extracted object such that the graphic feature value of the extracted object is weighted with a distance between the position of the extracted object and the optical axis of the inspection target optical member so that the graphic feature value becomes heavier as the distance decreases; and
- calculating an evaluation function based on all normalized values with respect to all extracted objects which are extracted from said image data.

16. An image-processing method according to claim 15, wherein said extracting step comprises comparing a brightness value of each pixel of the image data with a predetermined threshold value to transform the brightness value into a one bit binary value.

17. An image-processing method according to claim 15, wherein said graphic feature value measuring step measure an area of each extracted element as the graphic feature value.

18. An image-processing method according to claim 15, wherein said normalized value calculating step comprises dividing the graphic feature value of the extracted object by said reference which increases as a distance between the extracted object and the optical axis inspection target optical member increases.

19. An image-processing method according to claim 15, wherein said graphic feature value measuring step measure an area and brightness of each extracted object.

20. An image-processing method according to claim 15, wherein said position measuring step measure a position of a center of gravity of each extracted object.

21. An image-processing method, comprising:
- extracting, from image data representing an inspection target optical member, an extracted object comprising a portion of an optical member having a brightness different from a surrounding area of the optical member in the image data;
- measuring a graphic feature value of the extracted object;
- measuring a position of the extracted object in the image data;
- calculating a normalized value of the extracted object, by normalizing the graphic feature value using a reference in accordance with the position of the extracted object, the normalized value being calculated by dividing the graphic feature value of the extracted object by the reference which increases as a distance between the extracted object and the optical axis inspection target optical member increases; and
- calculating an evaluation function based on all normalized values with respect to all extracted objects which are extracted from the image data, wherein measuring a position of the extracted object discriminates a region, among a plurality of concentric regions within the image of the inspection target optical member about the optical axis of the inspection target optical member, and from which the extracted object is extracted; and
- wherein calculating a normalized value divides the graphic feature value of the extracted object by a reference value corresponding to the discriminated region.

22. An image-processing method according to claim 21, wherein said calculating an evaluation function comprises:

calculating, for each of said concentric regions, a total of the normalized values with respect to all extracted objects extracted from each of said concentric regions, respectively; and calculating a square root of a sum of squares of the totals.

23. An image-processing method according to claim 21, wherein said calculating an evaluation function comprises:

classifying the extracted objects in accordance with types of optical defects which can cause the extracted objects;

calculating, for each said concentric region and each said type of optical defect, a total of the normalized values with respect to the extracted object;

calculating, for each said type of optical defect, a square root of a sum of squares of the totals; and calculating a square root of a sum of the squares of the square roots calculated for each said type of optical defect.

24. An image-processing method according to claim 23, wherein during said calculating an evaluation function, normalized values less than a predetermined level are discarded, unless at least a predetermined number of other extracted objects are within a predetermined interval from the extracted object having a normalized value less than the predetermined level.

25. An image-processing method according to claim 23, wherein said calculating an evaluation function further comprises calculating a product of the extracted objects having said normalized value less than the predetermined level with the predetermined interval from one another, the number being larger than the predetermined number, and a constant as the normalized value for all of the extracted objects within the predetermined interval, and classifying a result independently from the other types of optical defects.

26. A computer readable media storing a program for causing a computer to perform a method, comprising:

extracting, from image data representing an inspection target optical member, an extricated object portion of said optical member having brightness different from a surrounding area of said optical member;

measuring a graphic feature value of the extracted object relative to an optical axis of said inspection target optical member;

measuring a position of the extracted object in the image data;

calculating a normalized value of the extracted object, by normalizing the graphic feature value using a reference in accordance with the position of the extracted object such that the graphic feature value of the extracted object is weighted with a distance between the position of the extracted object and the optical axis of said inspection target optical member so that the graphic feature value becomes heavier as the distance decreases; and calculating an evaluation function based on all normalized values with respect to all extracted object which are extracted from same image data.

* * * * *